United States Patent
Tissier et al.

(10) Patent No.: US 10,619,071 B2
(45) Date of Patent: Apr. 14, 2020

(54) COATING COMPOSITIONS FOR COATING FIBRE CEMENT BOARD

(71) Applicant: BASF SE, Ludwigshafen am Rhein (DE)

(72) Inventors: Nicolas Tissier, Strasbourg (FR); Xavier Mollat du Jourdin, Wissembourg (FR); Hans-Juergen Denu, Friedelsheim (DE)

(73) Assignee: BASF SE, Ludwigshafen am Rhein (DE)

( * ) Notice: Subject to any disclaimer, the term of this patent is extended or adjusted under 35 U.S.C. 154(b) by 70 days.

(21) Appl. No.: 15/769,611

(22) PCT Filed: Oct. 19, 2016

(86) PCT No.: PCT/EP2016/075036
§ 371 (c)(1),
(2) Date: Apr. 19, 2018

(87) PCT Pub. No.: WO2017/067957
PCT Pub. Date: Apr. 27, 2017

(65) Prior Publication Data
US 2018/0305574 A1 Oct. 25, 2018

(30) Foreign Application Priority Data

Oct. 20, 2015 (EP) .................................. 15002992

(51) Int. Cl.
| | | |
|---|---|---|
| *C09D 133/12* | (2006.01) | |
| *C08F 220/18* | (2006.01) | |
| *C08F 265/06* | (2006.01) | |
| *C09D 133/08* | (2006.01) | |
| *C09D 7/65* | (2018.01) | |
| *C09D 7/63* | (2018.01) | |
| *C09D 4/06* | (2006.01) | |
| *C04B 41/63* | (2006.01) | |
| *C04B 41/00* | (2006.01) | |
| *C04B 41/48* | (2006.01) | |
| *C09D 133/10* | (2006.01) | |
| *C09D 5/02* | (2006.01) | |
| *C04B 111/00* | (2006.01) | |

(52) U.S. Cl.
CPC .......... *C09D 133/12* (2013.01); *C04B 41/009* (2013.01); *C04B 41/483* (2013.01); *C04B 41/63* (2013.01); *C08F 220/18* (2013.01); *C08F 265/06* (2013.01); *C09D 4/06* (2013.01); *C09D 5/022* (2013.01); *C09D 7/63* (2018.01); *C09D 7/65* (2018.01); *C09D 133/08* (2013.01); *C09D 133/10* (2013.01); *C04B 2111/00612* (2013.01)

(58) Field of Classification Search
CPC .. C09D 133/12; C09D 133/08; C09D 133/10; C09D 7/65; C09D 7/63; C09D 4/06; C09D 5/022; C04B 41/009; C04B 41/483; C04B 41/63; C04B 2111/00612; C08F 265/06
USPC ........................................................ 524/156
See application file for complete search history.

(56) References Cited

U.S. PATENT DOCUMENTS

| | | | |
|---|---|---|---|
| 4,226,007 | A | 10/1980 | Duenser |
| 5,208,282 | A * | 5/1993 | Rehmer .................. C08K 5/07 524/190 |
| 6,372,287 | B1 | 4/2002 | Schwartz et al. |
| 6,376,570 | B1 | 4/2002 | Zhao et al. |
| 6,500,492 | B1 | 12/2002 | Schwartz et al. |
| 6,828,393 | B1 | 12/2004 | Austin et al. |
| 2001/0000232 | A1 | 4/2001 | Zhao et al. |
| 2001/0003765 | A1 | 6/2001 | Mallya et al. |
| 2002/0007005 | A1 | 1/2002 | Reck et al. |
| 2005/0064249 | A1 | 3/2005 | Apitz et al. |

FOREIGN PATENT DOCUMENTS

| | | |
|---|---|---|
| CA | 2046215 A1 | 1/1992 |
| DE | 2 061 213 | 6/1971 |
| DE | 2 207 209 | 10/1972 |
| DE | 2 164 256 | 6/1973 |
| DE | 27 22 097 A1 | 11/1978 |
| DE | 38 27 975 A1 | 3/1990 |
| DE | 39 01 073 A1 | 7/1990 |
| DE | 40 03 422 A1 | 8/1991 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| DE | 103 43 726 B4 | 6/2007 |

(Continued)

OTHER PUBLICATIONS

International Search Report dated Jan. 20, 2017 in PCT/EP2016/075036 filed Oct. 19, 2016.

*Primary Examiner* — William K Cheung
(74) *Attorney, Agent, or Firm* — Oblon, McClelland, Maier & Neustadt, L.L.P.

(57) ABSTRACT

The present invention relates to the use of coating compositions for coating fiber cement boards, which contain at least one acrylate based aqueous polymer dispersions as a binder. The present invention further relates to specific acrylate based aqueous polymer dispersions and to a process for preparing these specific acrylate based aqueous polymer dispersions.

21 Claims, No Drawings

(56) References Cited

FOREIGN PATENT DOCUMENTS

| | | |
|---|---|---|
| EP | 0 458 144 A1 | 11/1991 |
| EP | 0 469 295 A2 | 2/1992 |
| EP | 0 771 328 | 5/1997 |
| EP | 1 046 682 A1 | 10/2000 |
| EP | 1 069 093 A1 | 1/2001 |
| EP | 0 915 071 B1 | 1/2004 |
| EP | 1 948 574 | 7/2008 |
| GB | 1411268 A | 10/1975 |
| WO | WO 93/25588 A1 | 12/1993 |
| WO | WO 95/33775 A1 | 12/1995 |
| WO | WO 96/33143 A1 | 10/1996 |
| WO | WO 97/11996 A1 | 4/1997 |
| WO | WO 99/46219 A1 | 9/1999 |
| WO | WO 00/20355 A1 | 4/2000 |
| WO | WO 2007/059516 A1 | 5/2007 |
| WO | WO 2012/084737 A1 | 6/2012 |

\* cited by examiner

COATING COMPOSITIONS FOR COATING FIBRE CEMENT BOARD

This application is the U.S. 371 National Stage Application of PCT International Application No. PCT/EP2016/075036, with international filing date of Oct. 19, 2016, which claims priority to European Patent Application No. 15002992.4, filed Oct. 20, 2015, the contents of which are incorporated herein by reference in their entireties.

The present invention relates to the use of coating compositions for coating fibre cement boards, which contain at least one acrylate based aqueous polymer dispersion as a binder. The present invention further relates to specific acrylate based aqueous polymer dispersions and to a process for preparing these specific acrylate based aqueous polymer dispersions.

BACKGROUND OF INVENTION

Fibre-cement boards, such as fibre-cement panels for roofings and siding boards are high-rate construction materials possessed of numerous advantages over other construction materials, such as, for example, wood panelling, polyvinyl chloride sheets or metal siding boards, made from aluminum or steel sheet, for example. One major advantage is the durability of fibre-cement sheets to weathering effects, and the mechanical stability, too, is oftentimes better than for other construction materials.

Fibre-cement boards are manufactured from cement, water, optionally with fillers, such as sand or silica, and of a fibre fraction comprising natural fibres, such as wood fibres or cellulosic fibres, for example, and also of synthetic fibres. The mixture is introduced into a mold, optionally dewatered on a sieve, and then cured. The raw mass may be cured as it is or else compacted by pressing in order to achieve a greater ultimate strength postcure. The fibre-cement boards may be manufactured as flat sheets or else as what are called corrugated or embossed sheets. The fibre-cement boards may be given a surface texture, by embossing, which mimics the appearance of, for example, a wood surface. The boards may be cut into a variety of shapes and sizes: large panels, small squares, rectangles or rhombuses, or else as shingle replicas or replicas of other building materials. The fibre-cement boards typically manufactured have a thickness in the range of about 3 to 20 mm.

Fibre-cement boards require curing. This is usually done in a humidified heat chamber with or without pressure. At temperatures above 30° C. to around 70° C., the curing of the cement takes place in an accelerated regime, within a few hours, to give a material having sufficient strength to resist being destroyed by crushing. Curing may also take place in an autoclave, under pressure, in which case the temperature may also be significantly higher, since water is unable to escape and it is not possible for the cement to "fire". The water needed for the hydration of the cement does not evaporate. Autoclave curing is performed, for example, at a temperature in the range of 100° C. to around 180° C.

One disadvantage of fibre-cement boards, is that the effect of weathering, in particular the action of water, leaches out the cationic constituents such as $Ca^{2+}$ over the course of time, lessening the strength of the components. A further deleterious property of mineral surfaces is the occurrence of efflorescence phenomena. These phenomena are presumably attributable to the polyvalent cations such as $Ca^{2+}$, which are present, in the mineral binders, in an alkaline environment. Through reaction with the carbon dioxide from the air, it is possible in this way for unattractive white lime flecks, difficult to dissolve in water, to form on the surface of the fibre-cement boards. The efflorescence may appear not only during the hardening of freshly prepared fibre-cement boards but also, under exposure to weathering, on fibre-cement boards that have already hardened.

Following their manufacture and curing, often fibre-cement boards are coated with an aqueous dispersion or paint, which is based on an aqueous polymer dispersion, in order to provide the necessary protection against efflorescence. The coating can be applied, e.g. by dipping, spraying, rolling or brushing or by a curtain coater. In some instances, the back and the edges of the fibre-cement boards are coated as well. After coating and drying have been carried out, the fibre-cement boards are usually stacked on one another while still in a warm state. In such stacks, there may be instances of sticking of the coated sheets to one another, since the coating binders may be too soft and hence lacking sufficient blocking resistance.

Apart from this, coated fibre cement boards often show poor weathering resistance in terms of gloss retention, as UV radiation from sunlight results in loss of gloss due to degradation of the binder and/or yellowing. Moreover, humidity may cause an undesirable color change of the coating, in particular in terms of lightness and whitening. Humidity may also result in an undesirable water-uptake of the coating which reduces mechanical strength of the coating.

Typical binders for coating compositions for the surfaces of mineral moldings such as concrete slabs or fibre cement boards include styrene/acrylic ester copolymers, homopolymers and copolymers of vinyl acetate, straight acrylates, and the like (cf. e.g., DE 21 64 256). The coatings obtainable with these polymer dispersions, however, are unable to provide satisfactory prevention of the passage of the cationic constituents (efflorescence). Moreover, coatings of this kind readily become soiled.

EP 458144 discloses aqueous polymer dispersions based on acrylate and vinylaromatic monomers, which contain keto group containing monomers and photoinitiators, namely benzophenone type compounds. The polymer dispersions are suggested as binders for coatings such as latex paints for walls, floors and ceilings, in particular in architectural coatings or facade paints, respectively.

Protection to surfaces of mineral moldings from the above-described efflorescence has also been improved by coating materials based on styrene/acrylate dispersions or on straight-acrylate dispersions of EP-A 469 295 and of WO 96/33143, respectively. For this purpose, EP-A 469 295 recommends the use of a specific aromatic sulfonate based anionic emulsifier, while WO 96/33143 advises the use of polymers which comprise, in copolymerized form, specific monomers containing sulfonate groups. The water resistance of films made of polymers containing such ionic species is however diminished due to their hydrophilicity. In particular, the coatings show a considerable water-uptake.

EP 915 071 discloses coating compositions based on copolymers of ethylenically unsaturated monomers containing 0.2% to 5% by weight of itaconic acid. The coating compositions are suggested for coating mineral moldings such as concrete slabs or fibre-cement boards. EP 915 071 focuses on the coating of concrete slabs.

WO 99/46219 teaches the use of coating compositions for mineral moldings, which contain polymer dispersions based on alkylmethacrylates different from methyl methacrylate. The dispersions contain large amounts of emulsifiers based on aromatic sulfonic acids, such as bis-sulfonated diphenyl ethers, and focusses on the coating on concrete slabs.

WO 00/20355 discloses the use coating compositions for mineral moldings, which contain slightly crosslinked polymer dispersions based on alkyl(meth)acrylates. The dispersions contain large amounts of emulsifiers based on aromatic sulfonic acids, such as bis-sulfonated diphenyl ethers, and focusses on the coating on concrete slabs.

EP 1069093 discloses a method for coating mineral moldings, such as concrete slabs, comprises the subsequent application of at least two different coating compositions based on aqueous polymer dispersions. The aqueous polymer dispersions are similar to those described in WO 96/33143 or WO 00/20355.

DE 103 43 726 discloses coated concrete moldings featuring effective effloresence protection by an aqueous polymer dispersion and of an anionic emulsifier having at least one phosphate and/or phosphonate group.

EP 1 948 574 discloses a coated fibre-cement article having a crush resistant top coating based on a multistage latex polymer. The multistage latex polymer features a glass transition temperature ($T_g$) gradient.

WO 2012/084737 discloses multistage latex polymers containing a sulfonated acrylic ester or (meth)acrylic amide monomer of the and their use thereof in coating compositions for fibre-cement boards.

None of the polymer dispersions of prior art provide for coatings on fibre cement boards, which show a good water resistance, a good weathering resistance, good efflorescence protection and low water-uptake, and at the same time an acceptable appearance, needed for coating application on fibre-cement boards.

The single-stage binders in prior-art coatings give access to blocking resistance but are formulated in such a way that significant amounts of solvents or film-forming assistants (coalescence aids) are needed to ensure proper film formation. As the solvents may evaporate into the environment, the low volatile coalescence aids will remain in the coating and may result in reduced mechanical strength. While the two-stage binders of the prior art do provide satisfactory blocking resistance, due to the hard-phase fraction therein, their weathering resistance, however, is often not up to the requirements.

SUMMARY OF INVENTION

It is an object of the present invention to provide binders and also coating compositions for the coating of fibre-cement boards, which exhibit increased water resistance, good weather resistance both with regard to impacts of humidity and UV radiation, and, moreover, feature good blocking resistance and outstanding efflorescence protection. Moreover, the binders should be suitable to be used without large amounts of volatile film-forming additives in order to ensure low VOC coating compositions.

It was surprisingly found that these and further objectives are solved by the aqueous polymer dispersions as defined herein, which are obtainable by free-radically initiated aqueous emulsion polymerization of ethylenically unsaturated monomers M, which comprise:

80 to 99.9% by weight, in particular 90 to 99.8% by weight, especially 95 to 99.7% by weight or 97 to 99.5% by weight, based on the total weight of monomers M, of at least one monoethylenically unsaturated monomer M1, selected from $C_1$-$C_{10}$ alkyl acrylates and $C_1$-$C_{10}$ alkyl methacrylates;

0.1 to 5% by weight, in particular 0.2 to 4% by weight, especially 0.3 to 3% by weight or 0.5 to 2.5%, based on the total weight of monomers M, of a monoethylenically unsaturated monomer M2, which is methacrylic acid; and optionally 0 to 19.9% by weight, in particular 0 to 9.8% by weight, especially 0 to 4.7% by weight or 0 to 2.5% based on the total weight of monomers M, of one or more ethylenically unsaturated monomers M3, which are different from monomers M1 and M2;

where the polymerized monomers M comprise less than 10% by weight, in particular less then 5% by weight, or even 0% by weight, based on the total weight of monomers M, of vinylaromatic monomers and less than 0.1% by weight, in particular less than 0.05% by weight or even 0% by weight, based on the total weight of monomers M, of ethylenically acidic monomers different from methacrylic acid, and where the aqueous polymer dispersion contains an emulsifier combination comprising i. at least one non-ionic emulsifier having a polyoxyethylene group and ii. at least one anionic emulsifier, wherein the emulsifier combination comprises less than 10% by weight, in particular less than 5% by weight, based on the total weight of the emulsifier combination of anionic emulsifiers having one or more aromatic bound sulfonate groups.

Coating compositions containing such polymer dispersions are particularly suitable as binders in coating compositions which are used for the coating of fibre-cement boards. The polymer dispersions provide for increased water resistance, good weather resistance both with regard to impacts of humidity and UV radiation, and, moreover, feature good blocking resistance and outstanding efflorescence protection. Moreover, the aqueous polymer dispersions can be used without large amounts of volatile film-forming additives without imparting the application properties and thereby allow for a low VOC content both in the polymer dispersion and the coating composition.

Therefore, the present invention relates to the use of a coating composition, which contains a polymer dispersion as defined herein for coating fibre-cement boards.

Aqueous polymer dispersions as described herein are novel and also form part of the invention, if the polymers dispersed therein show a glass transition temperature Tg in the range from 25 to 75° C., in particular from 30 to 65° C., or, in case of a multi-stage polymer a weight average glass transition temperature Tg in the range from 25 to 75° C., in particular from 30 to 65° C. and if the emulsifier combination comprises i. at least one non-ionic emulsifier having a polyoxyethylene group, which is selected from ethoxylated $C_{10}$-$C_{20}$-alkanols and comprises at least one ethoxylated $C_{10}$-$C_{20}$-alkanol having a degree of ethoxylation in the range from 25 to 60, in particular in the range from 30 to 50; and ii. at least one anionic emulsifier, which is selected from $C_8$-$C_{22}$-alkyl sulfonates, mono-$C_8$-$C_{22}$-alkyl sulfates, and the salts of semi esters of sulphuric acid with ethoxylated $C_8$-$C_{22}$-alkanols, and if the emulsifier combination comprises less than 10% by weight, in particular less than 5% by weight, based on the total weight of the emulsifier combination of anionic emulsifiers having one or more aromatic bound sulfonate groups.

The invention also relates to a method of producing such aqueous polymer dispersions, which method comprises free-radically initiated aqueous emulsion polymerization of ethylenically unsaturated monomers M as defined herein, where the free-radically initiated aqueous emulsion polymerization of ethylenically unsaturated monomers M is conducted in the presence of an emulsifier combination comprising:
i. at least one non-ionic emulsifier having a polyoxyethylene group, which is selected from ethoxylated $C_{10}$-$C_{20}$-alkanols and comprises at least one ethoxylated $C_{10}$-$C_{20}$-alkanol having a degree of ethoxylation in the range from 25 to 60, in particular in the range from 30 to 50; and
ii. at least one anionic emulsifier, which is selected from $C_8$-$C_{22}$-alkyl sulfonates, mono-$C_8$-$C_{22}$-alkyl sulfates, and the salts of semi esters of sulphuric acid with ethoxylated $C_8$-$C_{22}$-alkanols,
provided that the monomers M result in a glass transition temperature Tg of the dispersed polymers of the aqueous polymer dispersion in the range from 25 to 75° C., in particular from 30 to 65° C., or, in case of a multi-stage polymer a weight average glass transition temperature Tg in the range from 25 to 75° C., in particular from 30 to 65° C. and provided that the emulsifier combination comprises less than 10% by weight, in particular less than 5% by weight, based on the total weight of the emulsifier combination of anionic emulsifiers having one or more aromatic bound sulfonate groups.

DETAILED DESCRIPTION OF INVENTION

The following statements relate to both the polymer dispersions contained in the coating compositions, to the polymer dispersions per se and to the method of producing the polymer dispersions.

The term "fibre-cement board", as used herein, is understood by a skilled person and relates to mineral boards, which are manufactured from a mixture of cement, water, optionally with fillers such as sand or silica, and a fibre fraction. The mixture is introduced into a mold, optionally dewatered on a sieve, and then cured. The raw mass may be cured as it is or else compacted by pressing in order to achieve a greater ultimate strength postcure. The fibre-cement boards to be coated by the coating composition of the invention may be flat sheets or else as what are called corrugated. The fibre-cement boards may have a surface texture, e.g. an embossed surface, which mimics the appearance of, for example, a wood surface. The fibre-cement boards may also have no surface texture but a smooth surface. The boards may be cut into a variety of shapes and sizes: large panels, small squares, rectangles or rhombuses, or else as shingle replicas or replicas of other building materials. The fibre-cement boards are typically manufactured to a thickness of between 3 and 20 mm. The fibre-cement boards to be coated by the coating composition of the invention sheets for roofing, such as shingles, or sidings. The fibre-cement boards may be coated in an unattached state but also after mounting, e.g. for refurbishment.

The prefix $C_n$-$C_m$ indicates the number of carbon atoms a compound or a radical may have.

For example, "$C_1$-$C_{10}$ alkyl" means a linear or branched, saturated hydrocarbon radical (i.e. alkyl), which may have from 1 to 10 carbon atoms, and includes $C_1$-$C_4$ alkyl, such as methyl, ethyl, n-propyl, 2-propyl (=isopropyl), n-butyl, 2-butyl, 2-methylpropyl and 1,1-dimethylethyl (tert.-butyl), and also having 4 to 10 carbon atoms, such as n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 1-ethylbutyl, 2-ethylbutyl, n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl, and the like.

The terms "$C_8$-$C_{22}$-alkyl" or "$C_{10}$-$C_{20}$-alkyl" indicate a linear or branched, saturated hydrocarbon radical (i.e. alkyl), which may have from 8 to 22 carbon atoms or 10 to 20 carbon atoms, respectively. The terms $C_8$-$C_{22}$-alkyl and $C_{10}$-$C_{20}$-alkyl include individual alkyl radicals having from 8 to 22 carbon atoms or 10 to 20 carbon atoms, respectively, atoms but also mixtures of different alkyl radicals having from 8 to 22 carbon atoms or 10 to 20 carbon atoms, respectively. Examples include n-octyl, isooctyl, 2-ethylhexyl, n-nonyl, isononyl, 2-propylhexyl, n-decyl, isodecyl, 2-propylheptyl, n-undecyl, isoundecyl, n-dodecyl (lauryl), isododecyl, n-tridecyl, isotridecyl, n-tetradecyl (=myristyl) and its isomers, n-pentadecenyl and its isomers, n-hexadecenyl (=cetyl) and its isomers, n-heptadecenyl and its isomers, n-octadecenyl (=stearyl) and its isomers, n-nonadecyl and its isomers, n-eicosanyl (=arachidyl), n-heneicosanyl and its isomers and n-docosanyl (=behenyl) and its isomers.

The terms, "$C_1$-$C_{10}$-alkanol", "$C_8$-$C_{22}$-alkanol" or "$C_{10}$-$C_{20}$-alkanol" indicate aliphatic monohydroxy compounds of the formula R—OH, wherein R is "$C_1$-$C_{10}$-alkyl", "$C_8$-$C_{22}$-alkyl" or "$C_{10}$-$C_{20}$-alkyl", respectively.

The "VOC content" as herein referred to relates to the total concentration of volatile organic compounds as determined in accordance with DIN ISO 11890-2:2013-07.

According to the invention, the aqueous polymer dispersion contains at least one non-ionic emulsifier having a polyoxyethylene group, hereinafter emulsifier N. The emulsifier N is preferably selected from ethoxylated $C_{10}$-$C_{20}$-alkanols, i.e. from compounds of the formula (N1)

$$R-[O-CH_2CH_2]OH \qquad (N1)$$

wherein R is $C_{10}$-$C_{20}$-alkyl, in particular $C_{12}$-$C_{18}$-alkyl and n indicates the number average of the repeating units $CH_2CH_2O$. Usually, n is in the range of 2 to 60, in particular in the range from 10 to 50.

In a particular group of embodiments, the emulsifier N comprises at least one ethoxylated $C_{10}$-$C_{20}$-alkanol having a degree of ethoxylation in the range from 25 to 60, in particular in the range from 30 to 50, i.e. n is in the range from 25 to 60, in particular in the range from 30 to 50. In this particular group of embodiments, the emulsifier N may comprise one or more further ethoxylated $C_{10}$-$C_{20}$-alkanols having a degree of ethoxylation outside the range of 25 to 60, e.g. a degree of ethoxylation in the range from 5 to <25. In this particular group of embodiments, the ethoxylated $C_{10}$-$C_{20}$-alkanol having a degree of ethoxylation in the range from 25 to 60, in particular in the range from 30 to 50, preferably amounts to at least 40% by weight, in particular at least 60% by weight or at least 80% by weight, based on the total weight of emulsifier N contained in the aqueous polymer dispersion. Especially, the ethoxylated $C_{10}$-$C_{20}$-alkanol having a degree of ethoxylation in the range from 25 to 60, in particular in the range from 30 to 50, is the sole non-ionic emulsifier contained in the aqueous polymer dispersion or amounts to at least 95% by weight, based on the total weight of emulsifier N contained in the aqueous polymer dispersion.

According to the invention, the aqueous polymer dispersion contains at least one anionic emulsifier. The anionic emulsifier preferably contains less than 10% by weight, in particular less than 5% by weight, based on the total weight of the emulsifier combination, of anionic emulsifiers having one or more aromatic bound sulfonate groups, such as alkylbenzene sulfonates, alkylnaphthaline sulfonates, or mono- or bisalkylated diphenyletherdisulfonates, such as emulsifiers of formula (I):

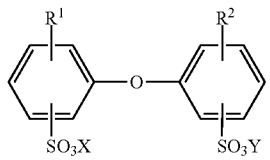

wherein X and Y indicate metal ions, such as sodium, potassium or calcium, or ammonium ions and $R^1$ and $R^2$ indicate hydrogen or $C_4$-$C_{22}$-alkyl, provided that at most one of $R^1$ and $R^2$ indicates hydrogen.

Preferred anionic emulsifiers are selected from the group consisting of $C_8$-$C_{22}$-alkyl sulfonates, mono-$C_8$-$C_{22}$-alkyl sulfates, and the salts of semi esters of sulphuric acid with ethoxylated $C_8$-$C_{22}$-alkanols, and mixtures thereof.

Particularly preferred anionic emulsifiers are selected from the group consisting of mono-$C_{10}$-$C_{16}$-alkyl sulfates, and the salts of semi esters of sulphuric acid with an ethoxylated $C_{10}$-$C_{16}$-alkanol, and mixtures thereof.

Especially preferred anionic emulsifiers are selected from the group consisting of mono-$C_{10}$-$C_{16}$-alkyl sulfates, and the salts of semi esters of sulphuric acid with ethoxylated $C_{10}$-$C_{16}$-alkanols, which have a degree of ethoxylation in the range from 2 to 10, and mixtures thereof.

Even more preferred, the anionic emulsifiers are selected from combinations of at least one mono-$C_{10}$-$C_{16}$-alkyl sulfate and at least one salt of a semi ester of sulphuric acid with an ethoxylated $C_{10}$-$C_{16}$-alkanol, in particular from combinations of at least one mono-$C_{10}$-$C_{16}$-alkyl sulfate and at least one salt of a semi ester of sulphuric acid with an ethoxylated $C_{10}$-$C_{16}$-alkanol, which has a degree of ethoxylation in the range from 2 to 10.

The anionic emulsifiers are usually present in the form of their salts, in particular in the form of their alkalimetal salts and or in the form of their ammonium salts. The alkali metal salts are understood to mean particularly the sodium and potassium salts. Ammonium salts are understood particularly to mean the salts bearing $NH_4^+$ as counterion.

In particular, the emulsifier combination comprises
i. at least one ethoxylated $C_{10}$-$C_{20}$-alkanol having a degree of ethoxylation in the range from 25 to 60, in particular in the range from 30 to 50, where the least one ethoxylated $C_{10}$-$C_{20}$-alkanol having a degree of ethoxylation in the range from 25 to 60, in particular in the range from 30 to 50 preferably amounts to at least 40% by weight, in particular at least 60% by weight or at least 80% by weight, based on the total weight of emulsifier N contained in the aqueous polymer dispersion, and where the ethoxylated $C_{10}$-$C_{20}$-alkanol having a degree of ethoxylation in the range from 25 to 60, in particular in the range from 30 to 50, is especially the sole non-ionic emulsifier contained in the aqueous polymer dispersion or amounts to at least 95% by weight, based on the total weight of emulsifier N contained in the aqueous polymer dispersion; and
ii. at least one anionic emulsifier, which is selected from the group consisting of mono-$C_{10}$-$C_{16}$-alkyl sulfates, and the salts of semi esters of sulphuric acid with an ethoxylated $C_{10}$-$C_{16}$-alkanol, and mixtures thereof.

More particularly, the emulsifier combination comprises
i. at least one ethoxylated $C_{10}$-$C_{20}$-alkanol having a degree of ethoxylation in the range from 25 to 60, in particular in the range from 30 to 50, where the least one ethoxylated $C_{10}$-$C_{20}$-alkanol having a degree of ethoxylation in the range from 25 to 60, in particular in the range from 30 to 50 preferably amounts to at least 40% by weight, in particular at least 60% by weight or at least 80% by weight, based on the total weight of emulsifier N contained in the aqueous polymer dispersion, and where the ethoxylated $C_{10}$-$C_{20}$-alkanol having a degree of ethoxylation in the range from 25 to 60, in particular in the range from 30 to 50, is especially the sole non-ionic emulsifier contained in the aqueous polymer dispersion or amounts to at least 95% by weight, based on the total weight of emulsifier N contained in the aqueous polymer dispersion; and
ii. at least one anionic emulsifier, which is selected from the group consisting of mono-$C_{10}$-$C_{16}$-alkyl sulfates, and the salts of semi esters of sulphuric acid with ethoxylated $C_{10}$-$C_{16}$-alkanols, which have a degree of ethoxylation in the range from 2 to 10, and mixtures thereof.

Especially, the emulsifier combination comprises
i. at least one ethoxylated $C_{10}$-$C_{20}$-alkanol having a degree of ethoxylation in the range from 25 to 60, in particular in the range from 30 to 50, where the least one ethoxylated $C_{10}$-$C_{20}$-alkanol having a degree of ethoxylation in the range from 25 to 60, in particular in the range from 30 to 50 preferably amounts to at least 40% by weight, in particular at least 60% by weight or at least 80% by weight, based on the total weight of emulsifier N contained in the aqueous polymer dispersion, and where the ethoxylated $C_{10}$-$C_{20}$-alkanol having a degree of ethoxylation in the range from 25 to 60, in particular in the range from 30 to 50, is especially the sole non-ionic emulsifier contained in the aqueous polymer dispersion or amounts to at least 95% by weight, based on the total weight of emulsifier N contained in the aqueous polymer dispersion; and
ii. a combination of at least one mono-$C_{10}$-$C_{16}$-alkyl sulfate and at least one salt of a semi ester of sulphuric acid with an ethoxylated $C_{10}$-$C_{16}$-alkanol, in particular a combination of at least one mono-$C_{10}$-$C_{16}$-alkyl sulfate and at least one salt of a semi ester of sulphuric acid with an ethoxylated $C_{10}$-$C_{16}$-alkanol, which has a degree of ethoxylation in the range from 2 to 10.

In the emulsifier combination contained in the polymer dispersion, the weight ratio of anionic emulsifier ii) to non-ionic emulsifier i) contained in the aqueous polymer dispersion is usually from 1:1.5 to 5:1 in particular from 1:1 to 3:1, especially from 1.2:1 to 2.5:1.

The total amount of emulsifiers contained in the aqueous polymer dispersion is usually in the range from 0.5 to 5% by weight, in particular in the range from 1 to 3% by weight, based on the dispersed polymer contained in the polymer dispersion.

According to the invention, the polymer, which is dispersed in the aqueous polymer dispersion is composed of ethylenically unsaturated monomers M comprising:
80 to 99.9% by weight, in particular 90 to 99.8% by weight, especially 95 to 99.7% by weight or 97 to 99.5% by weight, based on the total weight of monomers M, of at least one monoethylenically unsaturated monomer M1; and
0.1 to 5% by weight, in particular 0.2 to 4% by weight, especially 0.3 to 3% by weight or 0.5 to 2.5%, based on the total weight of monomers M, of methacrylic acid.

Suitable $C_1$-$C_{10}$ alkyl acrylates of the group of monomers M1, include, but are not limited to ethyl acrylate, n-propyl acrylate, isopropyl acrylate, n-butyl acrylate, 2-butyl acrylate, tert-butyl acrylate, n-pentyl acrylate, n-hexyl acrylate, n-heptyl acrylate, n-octyl acrylate, 2-ethylhexyl acrylate, n-decyl acrylate and 2-propylheptyl acrylate.

Suitable $C_1$-$C_{10}$ alkyl methacrylates of the group of monomers M1, include, but are not limited to methyl methacrylate, ethyl methacrylate, n-propyl methacrylate, isopropyl methacrylate, n-butyl methacrylate, 2-butyl methacrylate, tert-butyl methacrylate, n-pentyl methacrylate, n-hexyl methacrylate, n-heptyl methacrylate, n-octyl methacrylate, 2-ethylhexyl methacrylate, n-decyl methacrylate and 2-propylheptyl methacrylate.

Preferably, the monomers M1 are a mixture of at least one $C_1$-$C_4$ alkyl methacrylate and at least one $C_2$-$C_{10}$ alkyl acrylate, in particular a mixture of at least one $C_1$-$C_4$ alkyl methacrylate and at least one $C_4$-$C_{10}$ alkyl acrylate methylmethacrylate different from tert. butyl acrylate.

More particularly the monomer M1 is selected from the following mixtures:

M1a: mixtures of methylmethacrylate with at least one further monomer M1, which is selected from n-butyl acrylate, isobutyl acrylate, and $C_5$-$C_{10}$-alkylacrylates;

M1b: mixtures of tert.-butylacrylate with at least one further monomer M1, which is selected from n-butyl acrylate, isobutyl acrylate, and $C_5$-$C_{10}$-alkylacrylates; and M1c: mixtures of methylmethacrylate and tert.-butylacrylate with at least one further monomer M1, which is selected from n-butyl acrylate, isobutyl acrylate, and $C_5$-$C_{10}$-alkylacrylates.

Preference is given to monomer mixtures M1a. Especially, the monomer M1 is selected from mixtures of methyl methacrylate with n-butyl acrylate.

In very preferred group of embodiments, the monomer M1 is selected from mixtures M1a, M1b and M1c and methacrylic acid.

In a special group of embodiments, the monomer M1 is selected from mixtures of methyl methacrylate with n-butyl acrylate and methacrylic acid.

In addition to the monomers M1 and M2, the monomers M, which constitute the dispersed polymer contained in the aqueous polymer dispersion may contain one or more further monomers M3 in the above given amounts.

Suitable further monomers M3 include monoethylenically unsaturated monomers M3a having a limited solubility in water, e.g. at most 50 g/L at 25° C. and 1 bar, such as
- esters of monoethylenically unsaturated $C_4$-$C_8$ dicarboxylic acids with $C_1$-$C_{30}$-alkanols, such as the diesters of maleic acid and fumaric acid;
- vinylaromatic hydrocarbons such as styrene;
- olefins and haloolefins, such as ethylene, propene, vinyl chloride and vinylidene chloride;
- vinyl esters and allyl esters of saturated $C_1$-$C_{30}$ monocarboxylic acids, especially of saturated $C_1$-$C_{30}$ monocarboxylic acids, such as vinyl acetate, vinyl propionate, vinyl hexanoate, vinyl octanoate and vinyl esters of Versatic acids.

The total amount of monomers M3a will generally not exceed 19.9% by weight, in particular 9.8% by weight, especially 4.7% by weight or 2.5%, based on the total weight of monomers M.

Suitable further monomers M3 also include neutral monoethylenically unsaturated monomers M3b having a solubility in water more than 50 g/L at 25° C. and 1 bar, such as
- primary amides of monoethylenically unsaturated monocarboxylic acids having 3 to 8 carbon atoms, such as acrylamide and methacrylamide;
- monoethylenically unsaturated monomers bearing urea or keto groups, such as 2-(2-oxo-imidazolidin-1-yl)ethyl (meth)acrylate, 2-ureido (meth)acrylate, N-[2-(2-oxooxazolidin-3-yl)ethyl] methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM) and diacetonemethacrylamide;
- hydroxy-$C_2$-$C_4$-alkyl esters of monoethylenically unsaturated $C_3$-$C_8$ monocarboxylic acids, especially hydroxy-$C_2$-$C_4$-alkyl esters, or acrylic acid or of methacrylic acid, also referred to hereinafter as hydroxyalkyl (meth)acrylates, especially 2-hydroxyethyl (meth)acrylate, 3-hydroxypropyl (meth)acrylate, 4-hydroxybutyl (meth)acrylate, etc.;
- N-Vinyl lactams, such as N-vinyl pyrrolidone;
- and mixtures thereof.

Preferably, the amount of monomers M3b does not exceed the amount of monomers M2. In particular, the amount of monomers M3b is less than 0.5% by weight, in particular less than 0.2% by weight and especially less than 0.1% by eight, based on the total weight of monomers M.

The monomers M3 may also comprise a crosslinker monomer M3c, alone or in addition to the aforementioned monomers M3a and M3. Monomers which possess a cross-linking function are compounds having at least two, e.g. from 2-6, polymerizable, ethylenically unsaturated, non-conjugated double bonds in the molecule. It will be appreciated that mixtures of the aforementioned monomers M3c can also be used.

Suitable monomers M3c are, for example, acrylic esters, methacrylic esters, allyl ethers or vinyl ethers of at polyhydric alcohols having at least 2 OH groups, e.g. from 2-6 OH groups. The OH groups of the polyhydric alcohols may be completely or partly etherified or esterified. The cross-linkers, however, comprise at least two ethylenically unsaturated double bonds. Examples of the polyhydric alcohols include, but are not limited to, dihydric alcohols, such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, hydroxypivalic acid neopentyl glycol monoester, 2,2-bis(4-hydroxyphenyl)propane, 2,2-bis[4-(2-hydroxypropyl)-phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, block copolymers of ethylene oxide or propylene oxide, random copolymers of ethylene oxide and propylene oxide and polytetrahydrofurans having molecular weights of in each case 200 to 10 000. Examples of polyhydric alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. The polyhydric alcohols having more than two OH groups can be alkoxylated with ethylene oxide or propylene oxide.

Further suitable monomers M3c are, for example, the vinyl esters and the esters of monohydric, ethylenically unsaturated alcohols with ethylenically unsaturated $C_3$-$C_6$ carboxylic acids, examples being the esters with acrylic acid, methacrylic acid, itaconic acid, maleic acid or fumaric acid. Examples of ethylenically unsaturated alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. A preferred crosslinker M3c of this group is allyl methacrylate.

Further suitable monomers M3c are, for example, the vinyl esters and the esters of monohydric, ethylenically unsaturated alcohols with polybasic carboxylic acids, examples being esters of malonic acid, tartaric acid, trimellitic acid, phthalic acid, terephthalic acid, citric acid or succinic acid.

Further suitable monomers M3c are esters of ethylenically unsaturated carboxylic acids with the above-described polyhydric alcohols, examples being those of oleic acid, crotonic acid, cinnamic acid or 10-undecenoic acid.

Further suitable monomers M3c are, for example, straight-chain or branched, linear or cyclic, aliphatic or aromatic hydrocarbons which possess at least two double bonds, which in the case of aliphatic hydrocarbons must not be conjugated, examples being divinylbenzene, divinyltoluene, 1,7-octadiene, 1,9-decadiene, 4-vinyl-1-cyclohexene, trivinylcyclohexane or polybutadienes having molecular weights of 200 to 20 000.

Further suitable monomers M3c are, for example, the acrylamides, methacrylamides, and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides formed from allylamine and unsaturated carboxylic acids, such as acrylic acid, methacrylic acid, itaconic acid, maleic acid, or at least dibasic carboxylic acids, of the kind described above.

Further suitable monomers M3c are, for example, triallylamine and triallylmonoalkylammonium salts, e.g., triallylmethylammonium chloride or triallylmethylammonium methylsulfate.

Further suitable monomers M3c are, for example, N-vinyl compounds of urea derivatives, at least difunctional amides, cyanurates or urethanes, such as of urea, ethyleneurea, propyleneurea or tartaramide, for example, such as N,N'-divinylethyleneurea or N,N'-divinylpropyleneurea.

Further suitable monomers M3c are, for example, divinyldioxane, tetraallylsilane or tetravinylsilane.

Preferred monomers M3c are the esters of monohydric, ethylenically unsaturated alcohols with ethylenically unsaturated $C_3$-$C_6$ carboxylic acids, in particular the esters of acrylic acid and methacrylic acid, and especially the allyl esters of acrylic or methacrylic acid.

The monomers M include generally not more than 2% by weight, in particular not more than 1.5% by weight and especially not more than 1% by weight of monomers M3c, e.g. from 0.0005% to 2%, in particular from 0.001% to 1.5%, especially 0.01% to 1.5%, by weight, based on the total weight of the monomers M. Frequently, the monomers M do not contain more than 0.01 of monomers M3c, especially no or virtually no monomers M3c.

Crosslinking can also be accomplished, for example, by means of functional groups which are capable of reacting with complementary functional groups. In that case the complementary groups may both be attached to the emulsion polymer or for the crosslinking it is possible to use a crosslinker which is capable of being able to enter into a chemical crosslinking reaction with functional groups of the emulsion polymer. Monoethylenically unsaturated monomers having such functional groups are hereinafter termed crosslinkable monomers or monomers M3d, respectively. Reactive functional groups, which are capable of reacting with complementary groups include e.g. an aldehyde group, a keto group and oxirane group and N-bound hydroxymethyl groups. The functional groups are preferably keto groups or aldehyde groups. Suitable monomers M3d include acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups or one aldehyde group and one keto group in the alkyl radical, the alkyl radical preferably comprising a total of 3 to 10 carbon atoms, examples being (meth)acryloxyalkylpropanals, as described in DE-A-2722097. Also suitable, furthermore, are N-oxoalkyl(meth)acrylamides of the kind known, for example, from U.S. Pat. No. 4,226,007, DE-A-2061213 or DE-A-2207209. Particularly preferred monomers M3d are acetoacetyl (meth)acrylate, acetoacetoxyethyl (meth)acrylate and, more particularly, diacetoneacrylamide.

If the monomers contain a monomer M3d, the polymer dispersion may contain an external crosslinker. The external crosslinkers is usually a compound with at least 2 functional groups, more particularly 2 to 5 functional groups, which are capable of react with the functional monomers M3d, thereby forming a covalent bond. Functional groups for the crosslinking of the keto or aldehyde groups include, for example, hydrazide, hydroxylamine or oxime ether or amino groups. Suitable compounds of hydrazide groups are, for example, polycarboxylic hydrazides having a molar weight of up to 500 g/mol. Particularly preferred hydrazide compounds are dicarboxylic dihydrazides having preferably 2 to 10 C atoms. Examples of such include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide. Suitable compounds with hydroxylamine or oxime ether groups are specified for example in WO 93/25588.

The monomers M include generally not more than 5% by weight, in particular not more than 3% by weight and especially not more than 2% by weight of monomers M3d, e.g. from 0.005% to 5%, in particular from 0.01% to 3%, especially 0.1% to 2%, by weight, based on the total weight of the monomers M. Frequently, the monomers M do not contain more than 0.1 of monomers M3d, especially no or virtually no monomers M3d.

In one embodiment of the invention, the monomers M comprise a silane monomer M3e as monomer M3. Suitable silanmonomers contain an ethylenically unsaturated double bound, preferably a vinyl, allyl, acryl or methacryl group, and a silyl group, in particular a trialkoxysilyl group, such as a trimethoxysilyl or triethoxy silyl group or an alkyldialkoxysilyl group, such as a methyldimethoxysilyl, ethyldimethoxysilyl, methyldiethoxysilyl or ethyldiethoxysilyl group. Suitable silane monomers M3e include, for example, vinyltrialkoxysilanes, e.g. vinyltrimethoxysilane, alkylvinyldialkoxysilanes, e.g., methylvinyldialkoxysilane, or (meth)acryloxyalkyltrialkoxysilanes, e.g., (meth)acryloyloxypropyl-trimethoxysilane and (meth)acryloyloxypropyltriethoxysilane. If present, the monomers M comprise silane monomer M3e in amounts of up to 2% by weight, in particular from 0.05% to 1% by weight, based on the total weight of the monomers M.

Suitable further monomers M3 also include monoethylenically unsaturated acidic monomers M3f different from methacrylic acid having, in particular those having a solubility in water more than 50 g/L at 25° C. and 1 bar, such as monoethylenically unsaturated monocarboxylic acids having 3 to 8 carbon atoms different from methacrylic acid, such as acrylic acid;

monoethylenically unsaturated dicarboxylic acids having 4 to 8 carbon atoms, such as maleic acid, itaconic acid and citraconic acid;

monoethylenically unsaturated sulfonic acids and salts thereof, such as vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids and 2-acrylamido-2-methylpropanesulfonic acid, especially salts thereof, specifically the sodium salts thereof;

monoethylenically unsaturated monomers having a phosphate or phosphonate group and salts thereof, such as vinylphosphonic acid, allylphosphonic acid, 2-phosphonoethyl acrylate, 2-phosphonoethyl methacrylate, phosphonopropyl acrylate, phosphonopropyl methacrylate, styrenephosphonic acids, 2-acrylamido-2-methylpropanephosphonic acid, and phosphoric monoesters of the hydroxy-$C_2$-$C_4$-alkyl esters of monoethylenically unsaturated $C_3$-$C_8$ monocarboxylic acids specified hereinafter, for example the phosphoric monoesters of 2-hydroxyethyl (meth)acrylate, 3-hydroxypropyl (meth)acrylate, 4-hydroxybutyl (meth)acrylate, and especially the salts of the aforementioned monoethylenically unsaturated monomers having a phosphate or phosphonate group, specifically the sodium salts thereof;

and mixtures thereof. According to the invention, monomers M comprise less than 0.1% by weight, in particular less than 0.05% by weight, based on the total weight of monomers M, of monomers M3f. In particular, monomers M do not comprise any monomers M3f.

In general, the aqueous polymer dispersions have a glass transition temperature $T_g$ in the range from 25 to 75° C., in particular form 30 to 65° C., especially in the range from 35 to 60° C. In case of a multi-stage polymer containing 2 or more polymers or polymer phases, respectively, with different glass transition temperatures, the glass transition temperatures of the individual polymer phases may be outside the ranges given here. However, the a weight average glass transition temperature $T_g(av)$ as calculated by the equation $$T_g(av)=(T_g(1)*w_1+Tg(2)*w_2 \ldots Tg(n)*w_n)$$

is in the range from 25 to 75° C., in particular form 30 to 65° C., especially in the range from 35 to 60° C. In the equation $T_g(1)$, $T_g(2)$ to $T_g(n)$ indicate the individual glass transition temperatures in ° C. or K of the individual polymers 1, 2 to n while $w_1$, $w_2$ to $w_n$ indicate the amount in % by weight of the individual polymers 1, 2 to n. For example an aqueous dispersion of a multistage polymer containing 20% by weight of a first polymer phase 1 having a $T_g$ of −10° C. and 80% by weight of a second polymer phase having a $T_g$ of +40° C. have a weight average $T_g(av)=34°$ C. If the polymer of the aqueous polymer dispersions contains polymers having a different $T_g$'s, the difference between the lowest $T_g$ and the highest $T_g$ may be as high as e.g. 100° C., e.g. from 10 to 100° C. Preferably, the polymer dispersed in the aqueous polymer dispersion has only one $T_g$, or, if it contains polymers having different $T_g$'s the maximum difference of the lowest $T_g$ and the highest $T_g$ does not exceed 20 K, in particular 10 K. Preferably, the amount of polymers or polymer phases, respectively, which have a Tg of above 70° C. is less than 20%, based on the total amount of the polymer contained in the aqueous polymer dispersion.

The determination of glass transition temperature is conducted by the DSC method (differential scanning calorimetry, 20 K/min, midpoint measurement) to DIN 53765:1994-03 or ISO 11357-2, with sample preparation preferably to DIN EN ISO 16805:2005.

According to Fox (T. G. Fox, Bull. Am. Phys. Soc. 1956 [Ser. II] 1, page 123) and according to Ullmann's Encyclopädie der technischen Chemie [Ullmann's Encyclopedia of Industrial Chemistry] (vol. 19, page 18, 4th edition, Verlag Chemie, Weinheim, 1980), the following is a good approximation of the glass transition temperature of no more than lightly crosslinked copolymers:

$$1/Tg(Fox)=x_1/Tg_1+x_2/Tg_2+ \ldots x_n/Tg_n,$$

where $x_1$, $x_2$, ... $x_n$ are the mass fractions of the monomers 1, 2, ... n and $Tg_1$, $Tg_2$, ... $T_gn$ are the glass transition temperatures in degrees Kelvin of the polymers synthesized from only one of the monomers 1, 2, ... n at a time. The Tg values for the homopolymers of most monomers are known and listed, for example, in Ullmann's Encyclopedia of Industrial Chemistry, 5th ed., vol. A21, page 169, Verlag Chemie, Weinheim, 1992; further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989.

In the aqueous polymer dispersions S, the dispersed polymers are in the form of polymer particles. The polymer particles typically have a weight-average diameter $D_w$ in the range from 50 to 500 nm, in particular in the range from 60 to 300 nm and especially in the range from 80 to 200 nm. Determination of the weight average particle diameters is known to the person skilled in the art and is carried out, for example, by the analytical ultracentrifugation method. In this specification, weight-average particle diameter is understood as meaning the weight-average $D_{w50}$ value determined by the method of analytical centrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175). The weight-average particle diameter can also be determined by HDC (Hydrodynamic Chromatography fractionation), as for example described by H. Wiese, "Characterization of Aqueous Polymer Dispersions" in Polymer Dispersions and Their Industrial Applications (Wiley-VCH, 2002), pp. 41-73. For example, HDC measurements can be carried out using a PL-PSDA particle size distribution analyzer (Polymer Laboratories, Inc.), by injecting a small amount of sample into an aqueous eluent containing an emulsifier, resulting in a concentration of approx. 0.5 g/l and pumping the resulting mixture through a glass capillary tube of approx. 15 mm diameter packed with polystyrene spheres. As determined by their hydrodynamic diameter, smaller particles can sterically access regions of slower flow in capillaries, such that on average the smaller particles experience slower elution flow. The fractionation can be finally monitored using e.g. an UV-detector which measured the extinction at a fixed wavelength of 254 nm.

Preferably, the polymers in polymer dispersion have a narrow particle size distribution. More particularly, the ratio of weight-average particle diameter $D_{w50}$ to number-average particle diameter $D_{N50}$, i.e. the quotient $D_{w50}/D_{N50}$, will not exceed a value of 2.0, preferably 1.5 and especially 1.2 or 1.1, where both $D_{w50}$ and $D_{N50}$ are determined by the analytical centrifuge method.

As stated above, the aqueous polymer dispersions are obtainable by free-radically initiated aqueous emulsion polymerization of the ethylenically unsaturated monomers M, as described above.

In an aqueous emulsion polymerisation an aqueous emulsion of the ethylenically unsaturated monomers M is subjected to polymerisation conditions. For this purpose an aqueous emulsion of the monomers M is contacted with a free-radical polymerization initiator (free-radical initiator) at a temperature sufficient for generating the free radicals.

The emulsifier combination contained in the aqueous polymer dispersion is usually used for stabilizing the aqueous emulsion of the monomers M to be polymerized. In other words, the aqueous emulsion of the monomers M is subjected to the free-radically initiated emulsion polymerisation in the presence of the emulsifier combination. It is of course possible to use only a portion of the amount of the emulsifier combination contained in the aqueous polymer dispersion during the free-radically initiated emulsion polymerisation and to add the remainder afterwards. Frequently, a major portion, in particular at least 90% or the total amount of the emulsifier combination, which is contained in the aqueous polymer dispersion, is used during the free-radically initiated emulsion polymerisation.

The conditions required for the performance of the free-radically initiated emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of Synthetic High Polymers], F. Hölscher, Springer-Verlag, Berlin (1969)].

The free-radically initiated aqueous emulsion polymerization is usually triggered by means of the free-radical initiator. Free-radical initiators may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-methyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M is 0.01% to 5% by weight, preferably 0.1% to 3% by weight and especially preferably 0.2% to 1.5% by weight.

The amount of free-radical initiator required for the emulsion polymerization can be initially charged in the polymerization vessel in full. However, it is advantageous to initially charge none of or merely a portion of the free-radical initiator, preferably not more than 30% by weight, especially not more than 20% by weight, based on the total amount of the free-radical initiator required in the aqueous polymerization medium prior to the initiation of the polymerization reaction, and then, under polymerization conditions during the free-radical emulsion, to add the entire amount or any remaining residual amount, according to the consumption, batch-wise in one or more portions or continuously with constant or varying flow rates.

Initiation of the polymerization reaction is understood to mean the start of the polymerization reaction of the monomers present in the aqueous polymerization medium after the free-radical initiator has formed free radicals. The polymerization reaction can be initiated by addition of free-radical initiator to the aqueous polymerization medium in the polymerization vessel under polymerization conditions. Alternatively, it is possible to initially charge a small portion of the monomers M in polymerization vessel, to add a portion or the entirety of the free-radical initiator to the polymerization vessel under conditions which are not suitable for triggering a polymerization reaction, for example at low temperature, and then to establish polymerization conditions in the aqueous polymerization medium. Polymerization conditions are generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

More particularly, it has been found to be useful to initially charge a portion of the free-radical initiator, preferably not more than 30% by weight, especially not more than 20% by weight, based on the total amount of the polymerization initiator required for polymerization of monomers M.

For the free-radically initiated aqueous emulsion polymerization the monomers M can be initially charged entirely in the reaction vessel or be fed in over the course of polymerization. More particularly, it has been found to be useful to add the majority of the monomers M, especially at least 95% by weight, or the entirety of the monomers M to the polymerization reaction under polymerization conditions. Preferably, the monomers M are added over a period of at least 30 minutes, especially over a period of 0.5 to 10 h and particularly over a period of 1 to 5 h. The monomers M can be added in substance or preferably in the form of an aqueous emulsion. Preferably, the monomers M are added continuously at constant flow rates. Preferably, the entirety of the monomers M is metered in as a monomer mixture of the monomers M1 and M2, especially advantageously in the form of an aqueous monomer emulsion.

During the addition of the monomers M, the type of monomers and/or the relative amounts thereof can be altered continuously or stepwise. However, it is also possible that the type and relative amounts of monomers M, which are added to the polymerization reaction remains constant. For example, it is possible that the ratio of monomers M1 and M2 increases or decreases during the addition. However, it was found beneficial, if the monomers M2 are added during the addition of monomers M1 that the period for the addition of monomers M2 is at least 30% of the period for the addition of monomers M1. Different monomers may be added to the polymerization reaction via different feeds. However, it is beneficial to mix the monomers M beforehand.

In one preferred embodiment of the invention, the free-radically initiated aqueous emulsion polymerization of monomers M takes place in the presence of seed latex. Seed latex is an aqueous dispersion of finely divided polymer particles having an average particle diameter of preferably 20 to 40 nm. Seed latex is used in an amount of preferably 0.05% to 5% by weight, more preferably of 0.1% to 3% by weight, based on the total monomer amount of the polymer. Suitability is possessed, for example, by a latex based on polystyrene or based on polymethyl methacrylate. A preferred seed latex is polystyrene seed.

The free-radically initiated aqueous emulsion polymerization of the invention can be conducted at temperatures in the range from 0 to 170° C. Temperatures employed are generally 50 to 120° C., frequently 60 to 120° C. and often 70 to 110° C. The free-radical aqueous emulsion polymerization of the invention can be conducted at a pressure of less than, equal to or greater than 1 atm (atmospheric pressure), and so the polymerization temperature may exceed 100° C. and may be up to 170° C. If emulsion polymerizations are conducted under reduced pressure, pressures of 950 mbar, frequently of 900 mbar and often 850 mbar (absolute) are established. Advantageously, the free-radical aqueous emulsion polymerization of the invention is conducted at 1 atm with exclusion of oxygen, for example under an inert gas atmosphere, for example under nitrogen or argon.

The free-radically initiated aqueous emulsion polymerization of the monomers M can optionally be conducted in the presence of chain transfer agents. Chain transfer agents are understood to mean compounds that transfer free radicals and which reduce the molecular weight of the or control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3_methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof, substituted thiols, for example 2-hydroxyethanethiol, aromatic thiols, such as benzenethiol, ortho-, meta- or para-methylbenzenethiol, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another. The total amount of chain transfer agents optionally used in the process of the invention, based on the total amount of monomers M, will generally not exceed 1% by weight.

The free-radically initiated aqueous emulsion polymerization of the monomers M is naturally effected in an aqueous polymerization medium. The aqueous polymerization medium may in principle comprise minor amounts ($\leq 5\%$ by weight) of water-soluble organic solvents, for example methanol, ethanol, isopropanol, butanols, pentanols, but also acetone, etc. Preferably, however, the free-radically initiated aqueous emulsion polymerization of the monomers M is conducted in the absence of such solvents.

It is frequently advantageous when the aqueous polymer dispersion obtained on completion of free-radically initiated aqueous emulsion polymerization is subjected to an after-treatment, in order to reduce the residual monomer content. This after-treatment is effected either chemically, for example by completing the polymerization reaction using a more effective free-radical initiator system (known as post-polymerization), and/or physically, for example by stripping the aqueous polymer dispersion with steam or inert gas. Corresponding chemical and physical methods are familiar to those skilled in the art—see, for example, EP-A 771328, DE-A 19624299, DE-A 19621027, DE-A 19741184, DE-A 19741187, DE-A 19805122, DE-A 19828183, DE-A 19839199, DE-A 19840586 and DE-A 19847115. The combination of chemical and physical aftertreatment has the advantage that it removes not only the unconverted ethylenically unsaturated monomers but also other disruptive volatile organic constituents (VOCs) from the aqueous polymer dispersion.

The aqueous polymer dispersions used generally have solids contents in the range of 15% to 75%, preferably of 40% to 65% by weight, in particular form 45 to 60% by weight.

The aqueous polymer dispersion, which is obtainable by the free-radically initiated emulsion polymerisation contains a dispersed polymer, which essentially consist of the polymerized monomers M used for the polymerisation and optionally radicals from the initiator and chain transfer agent, the emulsifier combination and water. The dispersed polymer of the polymerized monomers M is hereinafter termed polymer P.

The aqueous polymer dispersions are used as binders in the coating compositions for the coating of the fibre cement boards.

As the polymer contained in the aqueous polymer dispersion contains acidic groups from the monomers M2 and optionally from other monomers and the polymerisation initiator, the aqueous polymer dispersion is frequently neutralized prior to formulating it as a coating composition. The neutralization of acid groups of the polymer is achieved by neutralizing agents known to the skilled of the art after polymerization and/or during the polymerization. For example, the neutralizing agent may be added in a joint feed with the monomers to be polymerized, or in a separate feed. Suitable neutralizing agents include organic amines, alkali hydroxides, ammonium hydroxides. In a preferred group of embodiments, no organic amine is used for the neutralization in order to keep the content of organic volatiles, i.e. the VOC as low as possible. In particular neutralization is achieved by using ammonia or alkali hydroxides, such as sodium hydroxide or potassium hydroxide. Preferably, a portion of the base is added during the polymerisation and a further portion is added, after completion of the polymerisation.

Preferably, the final dispersion has a pH of at least pH 8, e.g. in the range of pH 8 to pH 13, prior to the use in the coating composition.

The aqueous dispersion of the polymer can be used for coating fibre-cement board as it is as a coating composition, for example, if it is used as a clear varnish.

Frequently, the aqueous polymers dispersion is formulated as a coating composition. For this purpose, the aqueous coating composition is formulated with one or more customary formulation auxiliaries, including defoamers and/or film-forming assistants, also termed coalescing aids, but also pigments or fillers. Furthermore, the coating composition used for coating the fibre-cement board may contain additives, which result in crosslinking: Such additives include compounds, which act as a photoinitiator for the purpose of crosslinking upon exposure of the coating to electromagnetic radiation, including aromatic ketones such as benzophenone, according to DE-A 38 27 975. Further crosslinking additives are the aforementioned crosslinkers, such as water-soluble dihydrazides, according to DE-A 39 01 073, when the polymer comprises carbonyl-containing monomers in copolymerized form.

In one preferred embodiment of the present invention the aqueous polymer dispersions are used as a binder in a transparent varnish. In this case the coating compositions comprise, based on their overall weight, 10% to 60% by weight, preferably 40% to 55% by weight, of the polymer P and 0.1% to 30% by weight, preferably 0.5% to 10% by weight, of customary auxiliaries, particularly defoamers, film-forming assistants, thickeners and/or preservatives.

Preferably, the coating composition of the invention is formulated in a manner that the VOC, as determined in accordance with DIN ISO 11890-2:2013-07, is below 1000 ppm, e.g. by using suitable additives, which do not contribute to the VOC.

In another embodiment of the present invention, the aqueous polymer dispersions are used as a binder in pigmented and/or filled coating composition. In this case the total polymer content of the aqueous preparation is in the range from 10% to 60% by weight, preferably in the range from 20% to 40% by weight, and the auxiliaries content is in the range from 0.1% to 30% by weight and preferably in the range from 0.5% to 10% by weight, and the fillers and/or pigments content is in the range from 10% to 60% by weight and more particularly 15% to 40% by weight. The amount of pigments and/or fillers is generally between 50 and 450 parts by weight, based on 100 parts by weight of copolymer P in the aqueous preparation. Furthermore, pigmented preparations will preferably also include a dispersant and/or wetting agent in addition to the film-forming assistants and the defoamers. The proportion of the pigments and fillers in coating compositions can be described in a manner known per se via the pigment volume concentration (PVC).

The inventive effects of the polymer dispersion are especially manifested in the case of pigment-containing paints having a PVC of at least 5. Preferably, the PVC will not exceed a value of 40 and is specifically in the range from 5 to 30. However, the inventive effects of the polymer dispersions are also manifested in varnishes which typically have a pigment/filler content below 5% by weight, based on the varnish, and correspondingly have a PVC below 5. The PVC describes the ratio of the volume of pigments ($V_P$) and fillers ($V_F$) relative to the total volume, consisting of the volumes of binder ($V_B$, pigments and fillers in a dried coating film in percent:

$$PVK=(V_P+V_F)\times 100/(V_P+V_F+V_B).$$

Suitable pigments are, for example, inorganic white pigments such as titanium dioxide, preferably in the rutile form, barium sulfate, zinc oxide, zinc sulfide, basic lead carbonate, antimony trioxide, lithopone (zinc sulfide+barium sulfate), or colored pigments, for example iron oxides, carbon black, graphite, zinc yellow, zinc green, ultramarine, manganese black, antimony black, manganese violet, Prussian blue or Paris green. In addition to the inorganic pigments, the emulsion paints of the invention may also comprise organic color pigments, for example sepia, gamboge, Cassel brown, toluidine red, para red, Hansa yellow, indigo, azo dyes, anthraquinonoid and indigoid dyes, and also dioxazine, quinacridone pigments, phthalocyanine pigments, isoindolinone pigments and metal complex pigments. Also suitable are synthetic white pigments with air inclusions to enhance light scattering, such as the Ropaque® and AQA-Cell® dispersions. Additionally suitable are the Luconyl® brands from BASF SE, for example Luconyl® yellow, Luconyl® brown and Luconyl® red, particularly the transparent versions.

Examples of suitable fillers are aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers, or do not comprise any fillers. Fillers also include flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

The coating compositions used for coating the fibre-cement board may contain customary auxiliaries, including e.g. one or more of the following:
- dispersants,
- in-can preservatives,
- film preservatives,
- fungicides,
- algicides,
- thickeners,
- filming auxiliaries
- defoamers,
- flow promoters, and
- antifreeze agents.

Dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof. Generally speaking, the amount of dispersant used is 0.5% to 6%, preferably 1% to 3% by weight, based on the amount of pigment and/or filler.

Suitable filming auxiliaries are, for example, Texanol® from Eastman Chemicals and the glycol ethers and esters, commercially available, for example, from BASF SE under the Solvenon®, Lusolvan® and Loxanol® names, and from Dow under the Dowanol® trade name. The amount is preferably <10% by weight and more preferably <5% by weight, based on the overall formulation. Frequently, filming auxiliaries are used, which themselves do not contribute to the VOC of the coating composition.

Suitable thickeners are, for example, associative thickeners, such as polyurethane thickeners. The amount of the thickener is generally less than 2.5% by weight and more preferably less than 1.5% by weight of thickener, and especially 0.05% to 1% by weight, based on the solids content of the coating composition.

Suitable defoamers include polydimethylsiloxanes, aqueous wax dispersions and acetylenic diols such as TMDD.

The application rate of the coating composition to the surface of the fibre-cement board to be coated may vary and is typically 50 to 400 g/m² (calculated on a wet basis). Application may take place in a conventional way, by spraying, trowelling, knifing, rolling or pouring. It is important that the coating compositions of the invention can be applied not only with fibre-cement boards that have already hardened but also with freshly prepared fibre cement boards. In the latter case, drying of the coating and hardening are performed simultaneously. Frequently, the coating compositions of the invention are applied to the surface of the fibre cement board at elevated temperature, e.g. at a temperature from 30 to 100° C., in particular at a temperature from 40 to 90° C. or from 50 to 80° C.

Experiments

The solids content was determined by drying a defined amount of the aqueous polymer dispersion (about 1 g) to constant weight in an aluminum crucible having an internal diameter of about 5 cm at 120° C. in a drying cabinet (about 2 hours). Two separate measurements were conducted. The value reported in the example is the mean of the two measurements.

The median particle diameter of the polymer particles was determined by hydrodynamic chromatography (HDC) at 23° C. of an aqueous polymer dispersion, which was diluted with deionized water to a solids content of 0.05% b.w.

The glass transition temperature was determined by the DSC method (Differential Scanning calorimetry, 20 K/min, midpoint measurement, DIN 53765) by means of a DSC 822 instrument (TA 8000 series) from Mettler-Toledo.

The minimum film forming temperature (MFT) was determined in accordance with DIN ISO 2115:2001-04 using a Kofler heating bank.

The following abbreviations are used:

| | |
|---|---|
| $T_g$: | glass transition temperature |
| MFT | minimum film forming temperature |
| rpm: | rotation per minute |
| % b.w. | % by weight |
| Brüggolit FF6 M: | aqueous solution of sodium methane sulfonate, free of formaldehyde |
| TMDD: | 2,4,7,9-tetramethyl-5-decin-4,7-diol |
| n.d. | not determined |

Emulsifiers:
Emulsifier 1: 20% aqueous solution of $C_{16-18}$ fatty alcohol polyethoxylate having 18 ethyleneoxide units
Emulsifier 2: 45% aqueous solution of dodecyl diphenyl ether disulfonic acid sodium salt
Emulsifier 3: 15% aqueous solution of sodium lauryl sulfate
Emulsifier 4: 20% aqueous solution of 012-14 alkanol polyethoxylate having 8 ethyleneoxide units
Emulsifier 5: 27% aqueous solution of sodium salt of sulfonated 012 alkanol polyethoxylate having 3-5 ethyleneoxide units
Emulsifier 6: 20% aqueous solution of a branched $C_{13}$ alkanol polyethoxylate having 40 ethyleneoxide units Comparative Dispersion C1

The components below were introduced into a polymerization vessel equipped with metering means and temperature regulation:

Initial Charge:

| | |
|---|---|
| 402.1 g | water |
| 13.26 g | emulsifier 1 |
| 8.71 g | emulsifier 2 |

In a feed vessel, an emulsion was prepared from the following components:

| | |
|---|---|
| 560.2 g | water |
| 19.89 g | emulsifier 1 |
| 34.85 g | emulsifier 2 |
| 5.23 g | 50% aqueous solution of 2-acrylamido-2-methylpropanesulfonic acid |
| 13.07 g | 50% aqueous solution of acrylamide |
| 392.0 g | n-butyl acrylate |
| 908.2 g | methyl methacrylate |

In a third feed vessel the following feed was prepared:
Feed 3

| | |
|---|---|
| 56.00 g | 7% aqueous solution of sodium peroxodisulfate |

The initial charge was heated without the 50% aqueous solution of 2-acrylamido-2-methylpropanesulfonic acid to 95° C. (external temperature; polymerization temperature 90° C., stirring speed 150 rpm). The 50% aqueous solution of 2-acrylamido-2-methylpropanesulfonic acid was added and the mixture was stirred for 15 minutes.

Then feed 1 and feed 2 were commenced. Feed 1 was metered in over 3 hours, feed 2 over 3.5 hours. The stirring speed was reduced back to 100 rpm, and stirring continued for 30 minutes. Over the course of 30 minutes, 11.7 g of a 10% aqueous solution of tert-butyl hydroperoxide and 9.1 g of a 10% aqueous solution of hydroxymethanesulfinic acid were metered in. 2.61 g of a 5% aqueous hydrogen peroxide solution were added, and the mixture was stirred for 10 minutes. After cooling, neutralization was carried out with 1.57 g of 25% aqueous $NH_3$, and 161.77 g of water were added. This gave 2620 g of a 51.6% aqueous dispersion ($T_g$=44° C.).

Comparative Dispersion C2:

The components below were introduced into a polymerization vessel equipped with metering means and temperature regulation:
Initial Charge:

| | |
|---|---|
| 423.18 g | water |
| 25.64 g | polystyrene seed latex (33% in water) |

In a first feed vessel, an emulsion was prepared from the following components:
Feed 1

| | |
|---|---|
| 200.51 g | water |
| 47.0 g | emulsifier 3 |
| 17.63 g | emulsifier 4 |
| 9.84 g | 50% aqueous solution of 2-acrylamido-2-methylpropanesulfonic acid |
| 3.51 g | 3-methacryloxypropyl-trimethoxysilane |
| 472.77 g | n-butyl acrylate |
| 223.91 g | methyl methacrylate |

In a second feed vessel, an emulsion was prepared from the following components:
Feed 2

| | |
|---|---|
| 250.96 g | water |
| 47.0 g | emulsifier 3 |
| 17.63 g | emulsifier 4 |
| 14.10 g | methacrylic acid |
| 9.84 g | 50% aqueous solution of 2-acrylamido-2-methylpropanesulfonic acid |
| 3.51 g | 3-methacryloxypropyl-trimethoxysilane |
| 8.46 g | tert-dodecylmercaptan |
| 1.40 g | allylmethacrylate |
| 248.16 g | n-butyl acrylate |
| 432.87 g | methyl methacrylate |

In a third feed vessel the following feed was prepared:
Feed 3

| | |
|---|---|
| 60.1 g | 7% aqueous solution of sodium peroxodisulfate |

The initial charge was heated (external temperature: 90° C. polymerization temperature: 83° C., stirring speed: 150 rpm). Feeds 1 and 3 were commenced simultaneously. Feed 1 was metered in over 1.5 hours, and then feed 2 over 1.5 hours. Feed 3 was metered in over 3 hours. This was followed by stirring for 30 minutes, after which, over the course of 1 hour, 5.64 g of a 10% aqueous solution of tert-butyl hydroperoxide and 4.23 g of a 10% aqueous solution of hydroxymethanesulfinic acid were metered in. This was followed by neutralization with 168.10 g of 2% aqueous NaOH over 80 min, stirring for 10 minutes and cooling. Thereafter 253.43 g of water were added. This gave 2960.9 g of a 48.9% b.w. aqueous polymer dispersion (pH=8.1; measured $T_g(1)/T_g(2)$=−8° C./38° C.). The dispersion is characterized by a median particle diameter of 158 nm.

Inventive Dispersion D1:

The components below were introduced into a polymerization vessel equipped with metering means and temperature regulation:
Initial Charge:

| | |
|---|---|
| 540.80 g | water |
| 43.33 g | polystyrene seed latex (33% in water) |

In a first feed vessel, an emulsion was prepared from the following components:
Feed 1

| | |
|---|---|
| 288.27 g | water |
| 26.0 g | emulsifier 6 |
| 21.67 g | emulsifier 3 |
| 23.2 g | emulsifier 5 |
| 2.60 g | ammonia (25% aqueous solution) |
| 19.5 g | methacrylic acid |
| 184.6 g | n-butyl acrylate |
| 455.6 g | methyl methacrylate |

In a second feed vessel, an emulsion was prepared from the following components:
Feed 2

| | |
|---|---|
| 288.29 g | water |
| 26.0 g | emulsifier 6 |
| 21.67 g | emulsifier 3 |
| 23.2 g | emulsifier 5 |
| 184.6 g | n-butyl acrylate |
| 455.6 g | methyl methacrylate |

In a third feed vessel the following feed was prepared:
Feed 3

| | |
|---|---|
| 18.6 g | 3.5% aqueous solution of sodium peroxodisulfate |

The initial charge was heated (external temperature: 85° C. polymerization temperature: 85° C., stirring speed: 150 rpm). Feeds 1 and 3 were commenced simultaneously. Feed 1 was metered in over 1.75 hours, and then feed 2 over 1.75 hours. Feed 3 was metered in over 3.5 hours. This was followed by stirring for 30 minutes, after which, over the course of 1 hour, 11.7 g of a 10% aqueous solution of tert-butyl hydroperoxide and 20.80 g of Brüggolit FF6 M were metered in. After cooling to 55° C., the mixture was neutralized with 20.19 g of 95% aqueous solution of 2-amino-2-methyl-1-propanol over 10 min and further cooled down to 25° C. Thereafter, 154.2 g of water were added. This gave 2849.1 g of a 47.4% b.w. aqueous polymer dispersion (pH=10; $T_g$=55° C., MFT 57° C.). The dispersion is characterized by a median particle diameter of 142 nm.

Inventive Dispersion D2:

The components below were introduced into a polymerization vessel equipped with metering means and temperature regulation:

Initial Charge:

| 540.80 g | water |
|---|---|
| 43.33 g | polystyrene seed latex (33% in water) |

In a first feed vessel, an emulsion was prepared from the following components: Feed 1

| 144.1 g | water |
|---|---|
| 13.0 g | emulsifier 6 |
| 10.8 g | emulsifier 3 |
| 11.6 g | emulsifier 5 |
| 2.60 g | ammonia (25% aqueous solution) |
| 19.5 g | methacrylic acid |
| 92.3 g | n-butyl acrylate |
| 227.8 g | methyl methacrylate |

In a second feed vessel, an emulsion was prepared from the following components:
Feed 2

| 432.5 g | water |
|---|---|
| 39.0 g | emulsifier 6 |
| 32.5 g | emulsifier 3 |
| 34.8 g | emulsifier 6 |
| 276.9 g | n-butyl acrylate |
| 683.5 g | methyl methacrylate |

In a third feed vessel the following feed was prepared:
Feed 3

| 18.6 g | 3.5% aqueous solution of sodium peroxodisulfate |
|---|---|

The initial charge was heated (external temperature: 85° C. polymerization temperature: 85° C., stirring speed: 150 rpm). Feeds 1 and 3 were commenced simultaneously. Feed 1 was metered in over 1.75 hours, and then feed 2 over 1.75 hours. Feed 3 was metered in over 3.5 hours. This was followed by stirring for 30 minutes, after which, over the course of 1 hour, 11.7 g of a 10% aqueous solution of tert-butyl hydroperoxide and 20.80 g of Brüggolit FF6 M were metered in. After cooling to 55° C., the mixture was neutralized with 20.19 g of 95% aqueous solution of 2-amino-2-methyl-1-propanol over 10 min and further cooled down to 25° C. Thereafter, 154.2 g of water were added. This gave 2849.1 g of a 47.6% b.w. aqueous polymer dispersion (pH=9.9; $T_g$=55° C.). The dispersion is characterized by a median particle diameter of 144 nm.

Inventive Dispersion D3:

The components below were introduced into a polymerization vessel equipped with metering means and temperature regulation:
Initial Charge:

| 540.80 g | water |
|---|---|
| 43.33 g | polystyrene seed latex (33% in water) |

In a first feed vessel, an emulsion was prepared from the following components:

Feed 1

| 432.5 g | water |
|---|---|
| 39.0 g | emulsifier 6 |
| 32.5 g | emulsifier 3 |
| 34.8 g | emulsifier 5 |
| 276.9 g | n-butyl acrylate |
| 683.5 g | methyl methacrylate |

In a second feed vessel, an emulsion was prepared from the following components:
Feed 2

| 144.1 g | water |
|---|---|
| 13.0 g | emulsifier 6 |
| 10.8 g | emulsifier 3 |
| 11.6 g | emulsifier 5 |
| 2.60 g | ammonia (25% aqueous solution) |
| 19.5 g | methacrylic acid |
| 92.3 g | n-butyl acrylate |
| 227.8 g | methyl methacrylate |

In a third feed vessel the following feed was prepared:
Feed 3

| 18.6 g | 3.5% aqueous solution of sodium peroxodisulfate |
|---|---|

The initial charge was heated (external temperature: 85° C. polymerization temperature: 85° C., stirring speed: 150 rpm). Feeds 1 and 3 were commenced simultaneously. Feed 1 was metered in over 1.75 hours, and then feed 2 over 1.75 hours. Feed 3 was metered in over 3.5 hours. This was followed by stirring for 30 minutes, after which, over the course of 1 hour, 11.7 g of a 10% aqueous solution of tert-butyl hydroperoxide and 20.80 g of Brüggolit FF6 M were metered in. After cooling to 55° C., the mixture was neutralized with 20.19 g of 95% aqueous solution of 2-amino-2-methyl-1-propanol over 10 min and further cooled down to 25° C. Thereafter, 154.2 g of water were added. This gave 2849.1 g of a 47.5% b.w. aqueous polymer dispersion (pH=9.8; $T_g$=55° C.). The dispersion is characterized by a median particle diameter of 143 nm.

Inventive Dispersion D4:

The components below were introduced into a polymerization vessel equipped with metering means and temperature regulation:
Initial Charge:

| 540.80 g | water |
|---|---|
| 43.33 g | polystyrene seed latex (33% in water) |

In a first feed vessel, an emulsion was prepared from the following components:
Feed 1

| 272.5 g | water |
|---|---|
| 26.0 g | emulsifier 6 |
| 35.5 g | emulsifier 3 |
| 38.3 g | emulsifier 5 |
| 1.30 g | Ammoniac (as 25% aqueous solution) |
| 19.5 g | Methacrylic acid |
| 184.6 g | n-butyl acrylate |
| 455.6 g | methyl methacrylate |

In a second feed vessel, an emulsion was prepared from the following components:

Feed 2

| | |
|---|---|
| 288.29 g | water |
| 26.0 g | emulsifier 6 |
| 35.5 g | emulsifier 3 |
| 38.3 g | emulsifier 5 |
| 184.6 g | n-butyl acrylate |
| 455.6 g | methyl methacrylate |

In a third feed vessel the following feed was prepared:
Feed 3

| | |
|---|---|
| 18.6 g | 3.5% aqueous solution of sodium peroxodisulfate |

The initial charge was heated (external temperature: 85° C. polymerization temperature: 85° C., stirring speed: 150 rpm). Feeds 1 and 3 were commenced simultaneously. Feed 1 was metered in over 1.75 hours, and then feed 2 over 1.75 hours. Feed 3 was metered in over 3.5 hours. This was followed by stirring for 30 minutes, after which, over the course of 1 hour, 11.7 g of a 10% aqueous solution of tert-butyl hydroperoxide and 20.80 g of Brüggolit FF6 M were metered in. After cooling to 55° C., the mixture was neutralized with 20.19 g of 95% aqueous solution of 2-amino-2-methyl-1-propanol over 10 min and further cooled down to 25° C. Thereafter, 154.2 g of water were added. This gave 2875.3 g of a 46.9% b.w. aqueous polymer dispersion (pH=10; $T_g$=55° C.). The dispersion is characterized by a median particle diameter of 138 nm.

Inventive Dispersion D5:

The components below were introduced into a polymerization vessel equipped with metering means and temperature regulation:
Initial Charge:

| | |
|---|---|
| 540.80 g | water |
| 43.33 g | polystyrene seed latex (33% in water) |

In a first feed vessel, an emulsion was prepared from the following components:
Feed 1

| | |
|---|---|
| 288.3 g | water |
| 26.0 g | emulsifier 6 |
| 21.7 g | emulsifier 3 |
| 23.2 g | emulsifier 5 |
| 0.33 g | 3-methacryloxypropyl-trimethoxysilane |
| 1.30 g | ammonia (25% aqueous solution) |
| 19.5 g | methacrylic acid |
| 184.6 g | n-butyl acrylate |
| 455.3 g | methyl methacrylate |

In a second feed vessel, an emulsion was prepared from the following components:
Feed 2

| | |
|---|---|
| 288.29 g | water |
| 26.0 g | emulsifier 6 |
| 21.7 g | emulsifier 3 |
| 23.2 g | emulsifier 5 |
| 0.33 g | 3-methacryloxypropyl-trimethoxysilane |
| 184.6 g | n-butyl acrylate |
| 455.3 g | methyl methacrylate |

In a third feed vessel the following feed was prepared:
Feed 3

| | |
|---|---|
| 18.6 g | 3.5% aqueous solution of sodium peroxodisulfate |

The initial charge was heated (external temperature: 85° C. polymerization temperature: 85° C., stirring speed: 150 rpm). Feeds 1 and 3 were commenced simultaneously. Feed 1 was metered in over 1.75 hours, and then feed 2 over 1.75 hours. Feed 3 was metered in over 3.5 hours. This was followed by stirring for 30 minutes, after which, over the course of 1 hour, 11.7 g of a 10% aqueous solution of tert-butyl hydroperoxide and 20.80 g of Brüggolit FF6 M were metered in. After cooling to 55° C., the mixture was neutralized with 20.19 g of 95% aqueous solution of 2-amino-2-methyl-1-propanol over 10 min and further cooled down to 25° C. Thereafter, 154.2 g of water were added. This gave 2849.1 g of a 47.0% b.w. aqueous polymer dispersion (pH=10; $T_g$=55° C.). The dispersion is characterized by a median particle diameter of 141 nm.

Inventive Dispersion D6:

The components below were introduced into a polymerization vessel equipped with metering means and temperature regulation:
Initial Charge:

| | |
|---|---|
| 294.1 g | water |
| 14.8 g | polystyrene seed latex (33% in water) |

In a first feed vessel, an emulsion was prepared from the following components:
Feed 1

| | |
|---|---|
| 218.5 g | water |
| 70.0 g | emulsifier 6 |
| 35.0 g | emulsifier 3 |
| 18.8 g | emulsifier 5 |
| 10.5 g | methacrylic acid |
| 198.8 g | n-butyl acrylate |
| 490.7 g | methyl methacrylate |

In a second feed vessel the following feed was prepared:
Feed 2

| | |
|---|---|
| 10.0 g | 3.5% aqueous solution of sodium peroxodisulfate |

The initial charge was heated (external temperature: 85° C. polymerization temperature: 85° C., stirring speed: 150 rpm). Feeds 1 and 2 were commenced simultaneously and metered over 3.5 h. This was followed by stirring for 30 minutes and a neutralization with 6.3 g 25% aqueous solution of ammonia, after which, over the course of 1 hour, 6.3 g of a 10% aqueous solution of tert-butyl hydroperoxide and 5.6 g of 10% aqueous solution of hydroxymethanesulfinic acid were metered in. After cooling to 25° C., the mixture was neutralized with 3.4 g of 25% aqueous solution of sodium hydroxide over 10 min. Thereafter, 72.8 g of water were added. This gave 1465.5 g of a 49.2% b.w. aqueous polymer dispersion (pH=9.7, measured $T_g$=56° C.). The dispersion is characterized by a median particle diameter of 148 nm.

Comparative Dispersion C3:

The components below were introduced into a polymerization vessel equipped with metering means and temperature regulation:

Initial Charge:

| 499.2 g | water |
|---|---|
| 40.0 g | polystyrene seed latex (33% in water) |

In a first feed vessel, an emulsion was prepared from the following components:
Feed 1

| 260.4 g | water |
|---|---|
| 24.0 g | emulsifier 6 |
| 20.0 g | emulsifier 3 |
| 21.4 g | emulsifier 5 |
| 12.0 g | 50% aqueous solution of 2-acrylamido-2-methylpropanesulfonic acid |
| 2.40 g | ammmonia (25% aqueous solution) |
| 18.0 g | methacrylic acid |
| 170.4 g | n-butyl acrylate |
| 414.6 g | methyl methacrylate |

In a second feed vessel, an emulsion was prepared from the following components:
Feed 2

| 260.1 g | water |
|---|---|
| 24.0 g | emulsifier 6 |
| 20.0 g | emulsifier 3 |
| 21.4 g | emulsifier 5 |
| 12.0 g | 50% aqueous solution of 2-acrylamido-2-methylpropanesulfonic acid |
| 170.4 g | n-butyl acrylate |
| 414.6 g | methyl methacrylate |

In a third feed vessel the following feed was prepared:
Feed 3

| 34.3 g | 3.5% aqueous solution of sodium peroxodisulfate |
|---|---|

The initial charge was heated (external temperature: 85° C., polymerization temperature: 85° C., stirring speed: 150 rpm). Feeds 1 and 3 were started simultaneously. Feed 1 was metered into the polymerization vessel within a period of 1.75 h, followed by feed 2 within a period of 1.75 h. Feed 3 was metered into the polymerization vessel within a period of 3.5 hours. After completion of feeds 2 and 3 stirring was continued at 85° C. for 30 minutes, after which, over the course of 1 h, 10.8 g of a 10% aqueous solution of tert-butyl hydroperoxide and 19.2 g of Brüggolit FF6 M were metered into the polymerization vessel. After cooling to 55° C., the mixture was neutralized with 18.6 g of 95% aqueous solution of 2-amino-2-methyl-1-propanol over 10 min and further cooled down to 25° C. Thereafter, 142.3 g of water were added. Thereby 2629.9 g of a 47.5% b.w. aqueous polymer dispersion (pH=9.8; MFT 52° C.) was obtained. The dispersion is characterized by a median particle diameter of 129 nm.

Comparative Dispersion C4:

The components below were introduced into a polymerization vessel equipped with metering means and temperature regulation:
Initial Charge:

| 499.2 g | water |
|---|---|
| 40.0 g | polystyrene seed latex (33% in water) |

In a first feed vessel, an emulsion was prepared from the following components:
Feed 1

| 287.5 g | water |
|---|---|
| 24.0 g | emulsifier 6 |
| 20.0 g | emulsifier 2 |
| 2.40 g | ammmonia (25% aqueous solution) |
| 18.0 g | methacrylic acid |
| 170.4 g | n-butyl acrylate |
| 414.6 g | methyl methacrylate |

In a second feed vessel, an emulsion was prepared from the following components:
Feed 2

| 287.3 g | water |
|---|---|
| 24.0 g | emulsifier 6 |
| 20.0 g | emulsifier 2 |
| 170.4 g | n-butyl acrylate |
| 414.6 g | methyl methacrylate |

In a third feed vessel the following feed was prepared:
Feed 3

| 34.3 g | 3.5% aqueous solution of sodium peroxodisulfate |
|---|---|

The initial charge was heated (external temperature: 85° C., polymerization temperature: 85° C., stirring speed: 150 rpm). Feeds 1 and 3 were started simultaneously. Feed 1 was metered into the polymerization vessel within a period of 1.75 h, followed by feed 2 within a period of 1.75 h. Feed 3 was metered into the polymerization vessel within a period of 3.5 hours. After completion of feeds 2 and 3 stirring was continued at 85° C. for 30 minutes, after which, over the course of 1 h, 10.8 g of a 10% aqueous solution of tert-butyl hydroperoxide and 19.2 g of Brüggolit FF6 M were metered into the polymerization vessel. After cooling to 55° C., the mixture was neutralized with 18.6 g of 95% aqueous solution of 2-amino-2-methyl-1-propanol over 10 min and further cooled down to 25° C. Thereafter, 142.3 g of water were added. Thereby 2629.9 g of a 47.5% b.w. aqueous polymer dispersion (pH=9.9; MFT 54° C.) was obtained. The dispersion is characterized by a median particle diameter of 124 nm.

Comparative Dispersion C5:

The components below were introduced into a polymerization vessel equipped with metering means and temperature regulation:
Initial Charge:

| 504.2 g | water |
|---|---|
| 25.5 g | polystyrene seed latex (33% in water) |

In a first feed vessel, an emulsion was prepared from the following components:
Feed 1

| 362.5 g | water |
|---|---|
| 120.0 g | emulsifier 6 |
| 60.0 g | emulsifier 3 |
| 32.5 g | emulsifier 5 |

| 24.0 g | 50% aqueous solution of 2-acrylamido-2-methylpropanesulfonic acid |
| 18.0 g | methacrylic acid |
| 340.8 g | n-butyl acrylate |
| 829.1 g | methyl methacrylate |

In a second feed vessel the following feed was prepared:
Feed 2

| 34.3 g | 3.5% aqueous solution of sodium peroxodisulfate |

The initial charge was heated (external temperature: 85° C., polymerization temperature: 85° C., Stirring Speed: 150 Rpm). Feeds 1 and 2 were Started Simultaneously and metered into the polymerisation vessel within a period of 3.5 h. After completion of feeds 1 and 2 stirring was continued at 85° C. for 30 minutes. Then, the reaction mixture was neutralized by addition of 10.8 g of a 25% aqueous solution of ammonia, followed by simultaneous addition of 10.8 g of a 10% aqueous solution of tert-butyl hydroperoxide and 9.6 g of 10% aqueous solution of hydroxymethanesulfinic acid over a period of 1 hour. After cooling to 25° C., the mixture was neutralized with 5.8 g of 25% aqueous solution of sodium hydroxide over 10 min. Thereafter, 124.8 g of water were added. This gave 2512.4 g of a 49.9% b.w. aqueous polymer dispersion (pH=9.7, MFT=53° C.). The dispersion is characterized by a median particle diameter of 172 nm.

Comparative Dispersion C6:

The components below were introduced into a polymerization vessel equipped with metering means and temperature regulation:
Initial Charge:

| 504.2 g | water |
| 25.5 g | polystyrene seed latex (33% in water) |

In a first feed vessel, an emulsion was prepared from the following components:
Feed 1

| 426.6 g | water |
| 120.0 g | emulsifier 6 |
| 40.0 g | emulsifier 1 |
| 18.0 g | methacrylic acid |
| 340.8 g | n-butyl acrylate |
| 841.2 g | methyl methacrylate |

In a second feed vessel the following feed was prepared:
Feed 2

| 34.3 g | 3.5% aqueous solution of sodium peroxodisulfate |

The initial charge was heated (external temperature: 85° C., polymerization temperature: 85° C., stirring speed: 150 rpm). Feeds 1 and 2 were started simultaneously and metered into the polymerisation vessel within a period of 3.5 h. After completion of feeds 1 and 2 stirring was continued at 85° C. for 30 minutes. Then, the reaction mixture was neutralized by addition of 10.8 g of a 25% aqueous solution of ammonia, followed by simultaneous addition of 10.8 g of a 10% aqueous solution of tert-butyl hydroperoxide and 9.6 g of 10% aqueous solution of hydroxymethanesulfinic acid over a period of 1 hour. After cooling to 25° C., the mixture was neutralized with 5.8 g of 25% aqueous solution of sodium hydroxide over 10 min. Thereafter, 124.8 g of water were added. This gave 2512.4 g of a 49.9% b.w. aqueous polymer dispersion (pH=9.7, MFT=58° C.). The dispersion is characterized by a median particle diameter of 161 nm.

Comparative Dispersion C7:

The components below were introduced into a polymerization vessel equipped with metering means and temperature regulation:
Initial Charge:

| 389.7 g | water |
| 51.07 g | polystyrene seed latex (33% in water) |

In a first feed vessel, an emulsion was prepared from the following components:
Feed 1

| 323.9 g | water |
| 9.70 g | Emulsifier 1 |
| 23.15 g | Emulsifier 2 |
| 9.07 g | 50% by weight aqueous solution of acrylic acid |
| 462.3 g | n-butyl acrylate |
| 178.8 g | methylmethacrylate |

In a second feed vessel, an emulsion was prepared from the following components:
Feed 2

| 320.7 g | water |
| 9.70 g | Emulsifier 1 |
| 23.15 g | Emulsifier 2 |
| 10.37 g | 50% by weight aqueous solution of acrylamide |
| 9.07 g | 50% by weight aqueous solution of acrylic acid |
| 210.0 g | n-butyl acrylate |
| 431.0 g | methyl methacrylate |

In a third feed vessel the following feed was prepared:
Feed 3

| 55.6 g | 7.0% aqueous solution of sodium peroxodisulfate |

The initial charge was heated (external temperature: 83° C.; polymerization temperature: 83° C., stirring speed: 150 rpm). Feeds 1 and 3 were started simultaneously and metered into the polymerisation vessel within a period of 1.5 h (feed 1) and 3.0 h (feed 3) respectively. After completion of feed 1, feed 2 was immediately started and metered into the polymerisation vessel within a period of 1.5 h. After completion of feeds 1 and 2 stirring was continued at 85° C. for 30 minutes. Then, 11.7 g of a 10% aqueous solution of tert-butyl hydroperoxide and 9.10 g of 10% aqueous solution of hydroxymethanesulfinic acid were metered into the polymerization vessel within a period of 1 h. The polymerization mixture was neutralized with 55.09 g of a 2% aqueous solution of sodium hydroxide over 20 min and further stirred during 10 min. After adjusting the stirring speed down to 100 rpm, the dispersion was cooled down to 25° C. and 2.60 g of 5% aqueous solution of hydrogenperoxide was added. Thereafter, 78.8 g of water were added. This gave 2674.56 g of a 49.9% polymer dispersion (pH=5.3, MFT 12° C.). The dispersion is characterized by a median particle diameter of 126 nm as determined by HDC.

Inventive Dispersion D7

The polymer dispersion D7 was prepared by the protocol of comparative dispersion C7 but acrylic acid in feeds 1 and 2 was replaced by the same amount of methacrylic acid. This gave 2674.56 g of a 49.8% b.w. polymer dispersion (pH=6.1, MFT 16° C.). The dispersion is characterized by a median particle diameter of 126 nm as determined by HDC.

Performance Testing:

For determining the performance properties of the dispersions of the invention, paints were produced to the following formula:

| | |
|---|---|
| 92.0 g | water |
| 0.5 g | Rheology modifier (Rheovis PE 1330, BASF SE, Ludwigshafen) |
| 15.0 g | 25% aqueous dispersant (polycarboxylic acid: Dispex 4320, BASF SE, Ludwigshafen) |
| 1.0 g | TMDD 50% in Ethylene gylcol |
| 3.0 g | Silicon based defoamer (Byk 024, Byk Chemie, Wesel) |

5 minutes mixing

| | |
|---|---|
| 30.7 g | titanium dioxide (Kronos 2310) (Kronos International Inc., Leverkusen) |
| 173.7 g | red iron oxide (Bayferrox Red 110, Lanxess, Leverkusen) |
| 27.0 g | calcium carbonate (Omyacarb 850 OG, Omya GmbH, Cologne) |
| 596.6 g | binder dispersion |
| 8.5 g | water |
| 20.0 g | no VOC film forming agent (Loxanol CA 5308, BASF SE, Ludwigshafen) |
| 24.0 g | aqeuous wax dispersion (Michem Lube 368.E, Michelman Inc., Capellen, Luxembourg) |
| 8.0 g | Preservative (Acticide MKB3, Thor GmbH, Speyer) |

The paints or clear coats were sprayed onto preheated (80° C.), cured flat, corrugated and structured fibre-cement sheets, with an applied weight of approximately 10 g. The coated fibre-cement sheet was subsequently dried at 80° C. for 30 minutes.

Wet Coating Evaluation:

After drying, the coated fibre-cement sheet was placed for 5 days face up in a waterbath at 60° C.

Immediately upon removal of the fibre-cement sheet from the waterbath, in the wet state, the whitening behaviour was assessed.

| | |
|---|---|
| 1 | no whitening |
| 2 | a few white spots |
| 3 | a few white flecks |
| 4 | a number of larger white areas |
| 5 | white area |

Efflorescence Protection Evaluation:

After the coated sheet had been dried off, the degree of efflorescence was assessed visually. This assessment was based on the following scale of ratings:

0=no efflorescence
1=virtually no efflorescence
2=slight efflorescence
3=moderate efflorescence
4=severe efflorescence
5=very severe efflorescence In order to determine the color change of coated fibre-cement sheets exposed to weathering, an assessment is made of the difference in lightness between the weathered and unweathered area, visually. This is done on the basis of a scale from 0 to 2:

0=no difference
1=slightly perceptible difference
2=distinctly perceptible difference The "visual impression" test describes the quality of the coating in its entirety without exposure beforehand. The important factor is a uniform, slightly lustrous appearance of the coated roof shingle, without defects.

Blocking Test

The paints were applied to preheated (80° C.), cured fibre-cement sheets, with an application weight of approximately 10 g. The coated fibre-cement sheet was subsequently dried at 80° C. for 30 minutes. After drying had taken place, two coated fibre-cement sheets were placed with their faces against one another, and a 50 kg, 180 kg or 250 kg weight was applied to the area of 10*10 cm at 50° C. for 24 hours. The sheets were then cooled to room temperature and an attempt was made to part the sheets.

0=The specimens come apart without force
1=The specimens can be parted without application of force
2=The specimens can be parted with slight application of force
3=The specimens can be parted with greater application of force
4=The specimens can be parted with strong application of force
5=The specimens can no longer be parted The performance of all dispersions mentioned above was assessed according to the tests methods above.

TABLE 1

Performance testing on fibre-cement sheets

| Example | Δ Color [1] | W [2] | Effl [3] | Visual appearance | Water uptake (24 h/72 h) [4] | BT [5] |
|---|---|---|---|---|---|---|
| C1 | 2 | 3 | 2 | moderate, flecky | n.d. | 2.5 [5b] |
| C2 | 1-2 | 2 | 1-2 | good - moderate | 18.9/30.4 | 1 [5a] |
| C3 | n.d. | n.d. | 0 | Poor | 22.7/21.4 | 0 [5c] |
| C4 | n.d. | n.d. | 0 | Poor | 9.5/16.8 | 0 [5c] |
| D1 | 0 | 0-1 | 0 | good - moderate | 11.0/14.4 | 0 [5c] |
| D2 | 0 | 0 | 3 | good - moderate | 8.5/6.3 | 0 [5b] |
| D3 | 0 | 0 | 3 | good - moderate | 6.8/5.6 | 0 [5b] |
| D4 | 0 | 0 | 0 | good - moderate | 11.7/12.0 | 0 [5b] |
| D5 | 0 | 0 | 0 | good - moderate | 9.5/13.9 | 0 [5b] |
| D6 | 0 | 0 | 0 | good - moderate | 7.9/10.0 | 0 [5b] |
| C5 | n.d. | n.d. | 0 | moderate | 17.6/28.4 | 2 [5c] |
| C6 | n.d. | n.d. | 0 | moderate | 7.1/9.8 | 1 [5c] |
| C7 | n.d. | n.d. | 0 | n.d. | 18.8/19.2 | n.d. |
| D7 | n.d. | n.d. | 0 | n.d. | 14.5/13.9 | n.d. |

[1] Color difference, dry between exposed and unexposed surface
[2] Whitening<
[3] Efflorescence
[4] Water uptake after 24 h/after 72 h
[5] Blocking Test ([5a]: 50 kg; [5b]: 180 kg; [5c]: 250 kg)

Weathering Testing

To test the weathering stability of the paints on fibre-cement sheets, a Xenon test is carried out in accordance with DIN EN ISO 11341 (cycle A), and inspection takes place after 500 hours in each case. In this Xenon test, coated fibre-cement sheets with a size of 5*13 cm are each illuminated in alternation for 102 minutes dry and for 18 minutes during which the sheets are dampened with a fine water mist. The relative humidity is set at 50% and the black standard temperature is 65° C. The irradiation power corresponds to 60 W UV light at 300-400 nm or 0.51 W/(m² nm) at a 340 nm light wavelength.

Damage criteria assessed are visible paint damage, such as cracks or delamination, color changes, and loss of gloss. The paint's gloss is measured with a gloss meter at a 60° angle before and after the weathering test.

Results of Xenon test after 500-hour and 1000 hour test duration in each case:

| Example | Gloss retention(%) after 500 h | Gloss retention(%) after 1000 h |
|---|---|---|
| C1 | n.d. | 30% |
| C2 | n.d. | 50.9% |
| C3 | 65.4% | 40.2% |
| C4 | 63.6% | 39.5% |
| D1 | 95.8% | 82.5% |
| D2 | 89.5% | 73.7% |
| D3 | 88.7% | 73.7% |
| D4 | 95.85 | 80.7% |
| D5 | 93.3% | 76.1% |
| D6 | 86.0% | 78.0% |
| C5 | 74.7% | 41.4% |
| C6 | 66.4% | 36.3% |

The invention claimed is:

1. A method for coating a fiber cement board, comprising applying a coating composition to a surface of the fiber cement board, the coating composition comprising as a binder an aqueous polymer dispersion, which is obtained by free-radically initiated aqueous emulsion polymerization of ethylenically unsaturated monomers M, which comprise:
80 to 99.9% by weight, based on the total weight of monomers M, of at least one monoethylenically unsaturated monomer M1, selected from $C_1$-$C_{10}$ alkyl acrylates and $C_1$-$C_{10}$ alkyl methacrylates;
0.1 to 5% by weight, based on the total weight of monomers M, of a monoethylenically unsaturated monomer M2, which is methacrylic acid; and
optionally 0 to 19.9% by weight, based on the total weight of monomers M, of one or more ethylenically unsaturated monomers M3, which are different from monomers M1 and M2;
wherein the polymerized monomers M comprise less than 10% by weight, based on the total weight of monomers M, of vinylaromatic monomers and less than 0.1% by weight, based on the total weight of monomers M, of ethylenically acidic monomers different from methacrylic acid,
wherein the dispersed polymer of the aqueous polymer dispersion has a glass transition temperature Tg in the range from 25 to 75° C., or, in case of a multi-stage polymer a weight average glass transition temperature Tg in the range from 25 to 75° C., and
wherein the aqueous polymer dispersion comprises an emulsifier combination comprising
i. at least one non-ionic emulsifier having a polyoxyethylene group and
ii. at least one anionic emulsifier,
wherein the emulsifier combination comprises less than 10%, based on the total weight of the emulsifier combination of anionic emulsifiers having one or more aromatic bound sulfonate groups.

2. The method of claim 1, wherein the anionic emulsifier is selected from the group consisting of $C_8$-$C_{22}$-alkyl sulfonates, mono-$C_8$-$C_{22}$-alkyl sulfates, and the salts of semi esters of sulphuric acid with ethoxylated $C_8$-$C_{22}$-alkanols, and mixtures thereof.

3. The method of claim 1, wherein the non-ionic emulsifier is selected from ethoxylated $C_{10}$-$C_{20}$-alkanols, and mixtures thereof.

4. The method of claim 3, wherein the ethoxylated $C_{10}$-$C_{20}$-alkanol comprises at least one ethoxylated $C_{10}$-$C_{20}$-alkanol having a degree of ethoxylation in the range from 25 to 60.

5. The method of claim 1, wherein polymer dispersion satisfies at least one of the following features x1 to x5 or any combination thereof:
x1 the total amount of emulsifiers contained in the aqueous polymer dispersion is from 0.5 to 5% by weight, based on the dispersed polymer contained in the polymer dispersion;
x2 the weight ratio of anionic emulsifier to non-ionic emulsifier contained in the aqueous polymer dispersion is from 1:1.5 to 5:1;
x3 the monomer M1 is selected from mixtures of methylmethacrylate with at least one further monomer M1, which is selected from n-butyl acrylate, isobutyl acrylate, and $C_5$-$C_{10}$-alkylacrylates; mixtures of tert-butylacrylate with at least one further monomer M1, which is selected from n-butyl acrylate, isobutyl acrylate, and $C_5$-$C_{10}$-alkylacrylates; and mixtures of methylmethacrylate and tert-butylacrylate with at least one further monomer M1, which is selected from n-butyl acrylate, isobutyl acrylate, and $C_5$-$C_{10}$-alkylacrylates;
x4 dispersed polymer of the aqueous polymer dispersion has a glass transition temperature Tg in the range from 30 to 65° C., or, in case of a multi-stage polymer a weight average glass transition temperature Tg in the range from 30 to 65° C.;
x5 the polymer dispersion has a VOC of less than 1000 ppm.

6. The method of claim 1, wherein the aqueous polymer dispersion, is obtained by free-radically initiated aqueous emulsion polymerization of ethylenically unsaturated monomers M, wherein at least 95% of the monomers M are added to the polymerization reaction under polymerization conditions.

7. The method of claim 6, wherein the monomers M2 are added during the addition of monomers M1 and wherein the period for the addition of monomers M2 is at least 30% of the period for the addition of monomers M1.

8. The method of claim 1, where the coating composition comprises at least one pigment.

9. The method of claim 1, wherein the coating composition is a clear coat.

10. An aqueous polymer dispersion, which is obtained by free-radically initiated aqueous emulsion polymerization of ethylenically unsaturated monomers M, which comprise:
80 to 99.9% by weight, based on the total weight of monomers M, of at least one monoethylenically unsaturated monomer M1, selected from $C_1$-$C_{10}$ alkyl acrylates and $C_1$-$C_{10}$ alkyl methacrylates;
0.1 to 5% by weight, based on the total weight of monomers M, of a monoethylenically unsaturated monomer M2, which is methacrylic acid; and
optionally 0 to 19.9% by weight, based on the total weight of monomers M, of one or more ethylenically unsaturated monomers M3, which are different from monomers M1 and M2;
wherein the polymerized monomers M comprise less than 10% by weight, based on the total weight of monomers M, of vinylaromatic monomers and less than 0.1% by weight, based on the total weight of monomers M, of ethylenically acidic monomers different from methacrylic acid, wherein the dispersed polymer of the aqueous polymer dispersion has a glass transition temperature Tg in the range from 25 to 75° C., or, in case of a multi-stage polymer a weight average glass transition temperature Tg in the range from 25 to 70° C., and wherein the aqueous polymer dispersion comprises an emulsifier combination comprising i. at least one non-ionic emulsifier having a polyoxyethylene group, which is selected from ethoxylated $C_{10}$-$C_{20}$-alkanols and comprises at least one ethoxylated $C_{10}$-$C_{20}$-alkanol having a degree of ethoxylation in the range from 25 to 60; and ii. at least one anionic emulsifier, which is selected from $C_8$-$C_{22}$-alkyl sulfonates, mono-$C_8$-$C_{22}$-alkyl sulfates, and the salts of semi esters of sulphuric acid with ethoxylated $C_8$-$C_{22}$-alkanols, wherein the emulsifier combination comprises less than 10%, based on the total weight of the emulsifier combination of anionic emulsifiers having one or more aromatic bound sulfonate groups.

11. The aqueous polymer dispersion of claim 10, wherein the aqueous polymer dispersion satisfies at least one of the features a) to e) or any combination thereof a) the total amount of emulsifiers contained in the aqueous polymer dispersion is from 0.5 to 5% by weight, based on the dispersed polymer contained in the polymer dispersion;

b) the weight ratio of anionic emulsifier to non-ionic emulsifier contained in the aqueous polymer dispersion is from 1:1.5 to 5:1;

c) the monomer M1 is selected from mixtures of methylmethacrylate with at least one further monomer M1, which is selected from n-butyl acrylate, isobutyl acrylate, and $C_5$-$C_{10}$-alkylacrylates; mixtures of tert-butylacrylate with at least one further monomer M1, which is selected from n-butyl acrylate, isobutyl acrylate, and $C_5$-$C_{10}$-alkylacrylates; and mixtures of methylmethacrylate and tert-butylacrylate with at least one further monomer M1, which is selected from n-butyl acrylate, isobutyl acrylate, and $C_5$-$C_{10}$-alkylacrylates;

d) the dispersed polymer of the aqueous polymer dispersion has a glass transition temperature Tg in the range from 30 to 60° C., or, in case of a multi-stage polymer a weight average glass transition temperature Tg in the range from 30 to 60° C.;

e) the polymer dispersion has a VOC of less than 1000 ppm.

12. The aqueous polymer dispersion of claim 10, which is obtained by free-radically initiated aqueous emulsion polymerization of ethylenically unsaturated monomers M, wherein at least 95% of the monomers M are added to the polymerization reaction under polymerization conditions and wherein especially the period for the addition of monomers M2 is at least 30% of the period for the addition of monomers M1.

13. A method for producing an aqueous polymer dispersion according to claim 10, the method comprising performing free-radically initiated aqueous emulsion polymerization of ethylenically unsaturated monomers M, which comprise:

80 to 99.9% by weight, based on the total weight of monomers M, of at least one monoethylenically unsaturated monomer M1, selected from $C_1$-$C_{10}$ alkyl acrylates and $C_1$-$C_{10}$ alkyl methacrylates;

0.1 to 5% by weight, based on the total weight of monomers M, of a monoethylenically unsaturated monomer M2, which is methacrylic acid; and optionally 0 to 19.9% by weight, based on the total weight of monomers M, of one or more ethylenically unsaturated monomers M3, which are different from monomers M1 and M2;

wherein the polymerized monomers M comprise less than 10% by weight, based on the total weight of monomers M, of vinylaromatic monomers and less than 0.1% by weight, based on the total weight of monomers M, of ethylenically acidic monomers different from monomers M2, and wherein the free-radically initiated aqueous emulsion polymerization of ethylenically unsaturated monomers M is conducted in the presence of an emulsifier combination comprising i. at least one non-ionic emulsifier having a polyoxyethylene group, which is selected from ethoxylated $C_{10}$-$C_{20}$-alkanols and comprises at least one ethoxylated $C_{10}$-$C_{20}$-alkanol having a degree of ethoxylation in the range from 25 to 60; and ii. at least one anionic emulsifier, which is selected from $C_8$-$C_{22}$-alkyl sulfonates, mono-$C_8$-$C_{22}$-alkyl sulfates, and the salts of semi esters of sulphuric acid with ethoxylated $C_8$-$C_{22}$-alkanols, wherein the emulsifier combination comprises less than 10%, based on the total weight of the emulsifier combination of anionic emulsifiers having one or more aromatic bound sulfonate groups.

14. The method of claim 13, wherein at least 95% of the monomers M are added to the polymerization reaction under polymerization conditions.

15. The method of claim 14, wherein the monomers M2 are added during the addition of monomers M1 and wherein the period for the addition of monomers M2 is at least 30% of the period for the addition of monomers M1.

16. The aqueous polymer dispersion of claim 10, wherein the dispersed polymer of the aqueous polymer dispersion has a glass transition temperature Tg in the range from 45 to 75° C., or, in case of a multi-stage polymer a weight average glass transition temperature Tg in the range from 45 to 70° C.

17. The method of claim 13, wherein the dispersed polymer of the aqueous polymer dispersion has a glass transition temperature Tg in the range from 45 to 75° C., or, in case of a multi-stage polymer a weight average glass transition temperature Tg in the range from 45 to 70° C.

18. The aqueous polymer dispersion of claim 10, wherein the anionic emulsifier is a combination of at least one mono-$C_{10}$-$C_{16}$-alkyl sulfate and at least one salt of a semi esters of sulphuric acid with an ethoxylated $C_{10}$-$C_{16}$-alkanol.

19. The method of claim 13, wherein the anionic emulsifier is a combination of at least one mono-$C_{10}$-$C_{16}$-alkyl sulfate and at least one salt of a semi esters of sulphuric acid with an ethoxylated $C_{10}$-$C_{16}$-alkanol.

20. The aqueous polymer dispersion of claim 10, wherein the polymerized monomers M comprise 0% by weight, based on the total weight of monomers M, of vinylaromatic monomers.

21. The method of claim 13, wherein the polymerized monomers M comprise 0% by weight, based on the total weight of monomers M, of vinylaromatic monomers.

* * * * *